(12) United States Patent
Vyas et al.

(10) Patent No.: US 12,222,090 B2
(45) Date of Patent: Feb. 11, 2025

(54) ENGAGEMENT SYSTEMS FOR RECESSED LUMINARES

(71) Applicant: SIGNIFY HOLDING B.V., Eindhoven (NL)

(72) Inventors: Gayatri Sunil Vyas, Pune (IN); Russell Bryant Green, Douglasville, GA (US); Yi Jin Jiang, Dongguan (CN)

( * ) Notice: Subject to any disclaimer, the term of this patent is extended or adjusted under 35 U.S.C. 154(b) by 0 days.

(21) Appl. No.: 18/413,309

(22) Filed: Jan. 16, 2024

(65) Prior Publication Data
US 2024/0255127 A1 Aug. 1, 2024

Related U.S. Application Data

(60) Provisional application No. 63/442,300, filed on Jan. 31, 2023.

(30) Foreign Application Priority Data

Mar. 28, 2023 (EP) ..................................... 23164724

(51) Int. Cl.
| F21V 21/04 | (2006.01) |
| F16M 13/02 | (2006.01) |
| F21V 21/14 | (2006.01) |
| F21V 23/00 | (2015.01) |

(52) U.S. Cl.
CPC .......... *F21V 21/049* (2013.01); *F16M 13/027* (2013.01); *F21V 21/04* (2013.01); *F21V 21/14* (2013.01); *F21V 23/008* (2013.01)

(58) Field of Classification Search
CPC ........ F21V 21/049; F21V 21/04; F21V 21/14; F21V 23/008; F21M 13/027

USPC ......................................... 362/365, 364, 148
See application file for complete search history.

(56) References Cited

U.S. PATENT DOCUMENTS

| 1,659,404 | A | * | 2/1928 | Lipschutz | ............... | F21V 21/02 |
| | | | | | | 411/116 |
| 5,477,439 | A | * | 12/1995 | Kowalenko | ............. | F21V 23/02 |
| | | | | | | 362/147 |
| 6,595,664 | B2 | * | 7/2003 | Bucher | ................... | F21V 21/03 |
| | | | | | | 403/380 |

(Continued)

FOREIGN PATENT DOCUMENTS

| CN | 218032855 U | 12/2022 |
| JP | 2017073266 A | 4/2017 |

*Primary Examiner* — Laura K Tso

(57) ABSTRACT

An engagement system for a recessed luminaire can include an engagement component having an engagement component body, a first bracket engagement extension, and a second bracket engagement extension, where the first and second bracket engagement extensions are movable with respect to the engagement component body. The engagement system can also include a bracket configured to be detachably coupled to the engagement component, where the bracket includes a bracket body, a first additional component coupling feature, and a second additional component coupling feature, where the bracket body includes an engagement component receiving feature that is configured to engage the first and second bracket engagement extensions, and where the engagement component is able to couple to and decouple from the bracket when the first and second bracket engagement extensions are moved with respect to the engagement component body.

14 Claims, 17 Drawing Sheets

(56) References Cited

U.S. PATENT DOCUMENTS

| | | | |
|---|---|---|---|
| 6,991,352 B2 * | 1/2006 | Garber | F21V 21/02 |
| | | | 362/147 |
| 2020/0080709 A1 * | 3/2020 | Boulanger | F21V 21/04 |
| 2021/0317977 A1 | 10/2021 | Jeswani et al. | |

* cited by examiner

ENGAGEMENT SYSTEMS FOR RECESSED LUMINARES

TECHNICAL FIELD

The present disclosure relates generally to recessed luminaires, and more particularly to systems, methods, and devices for engagement systems for recessed luminaires.

BACKGROUND

Recessed luminaires (e.g., downlights) are mostly hidden from view once installed, with most of a recessed luminaire being positioned above a ceiling or other part of a structure, and with the bottom or distal end (often the trim) of the recessed luminaire being visible. Recessed luminaires can vary in size, from an inch or two in diameter to as much as six inches or more in diameter. Recessed luminaires can be configured as a housing-based retrofit or as a direct mount (without a housing). Each configuration requires different components in the current art. As a result, expanded inventory must be carried for both configurations.

SUMMARY

In general, in one aspect, the disclosure relates to an engagement system for a recessed luminaire. The engagement system can include an engagement component having an engagement component body, a first bracket engagement extension that extends from a first portion of the engagement component body, and a second bracket engagement extension that extends from a second portion of the engagement component body, where the first bracket engagement extension and the second bracket engagement extension are movable with respect to the engagement component body. The engagement system can include a bracket configured to be detachably coupled to the engagement component, where the bracket comprises a bracket body, a first additional component coupling feature that extends from a first portion of the bracket body, and a second additional component coupling feature that extends from a second portion of the bracket body, where the bracket body includes an engagement component receiving feature that is configured to engage the first bracket engagement extension and the second bracket engagement extension, and where the engagement component is configured to couple to and decouple from the bracket when the first bracket engagement extension and the second bracket engagement extension are moved with respect to the engagement component body.

In another aspect, the disclosure relates to a recessed luminaire that includes a driver compartment and an engagement system. The driver compartment can house a driver and include a first coupling feature along a bottom surface. The engagement system can include an engagement component having an engagement component body, a first bracket engagement extension that extends from a first portion of the engagement component body, and a second bracket engagement extension that extends from a second portion of the engagement component body, where the first bracket engagement extension and the second bracket engagement extension are movable with respect to the engagement component body, and where the engagement component body comprises a second coupling feature that complements the first coupling feature of the driver compartment. The engagement system can also include a bracket configured to be detachably coupled to the engagement component, wherein the bracket includes a bracket body, a first additional component coupling feature that extends from a first portion of the bracket body, and a second additional component coupling feature that extends from a second portion of the bracket body, where the bracket body includes an engagement component receiving feature that is configured to engage the first bracket engagement extension and the second bracket engagement extension, where the engagement component is able to couple to and decouple from the bracket when the first bracket engagement extension and the second bracket engagement extension are moved with respect to the engagement component body.

These and other aspects, objects, features, and embodiments will be apparent from the following description and the appended claims.

BRIEF DESCRIPTION OF THE DRAWINGS

The drawings illustrate only example embodiments and are therefore not to be considered limiting in scope, as the example embodiments may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements.

DETAILED DESCRIPTION

Figure 1A:
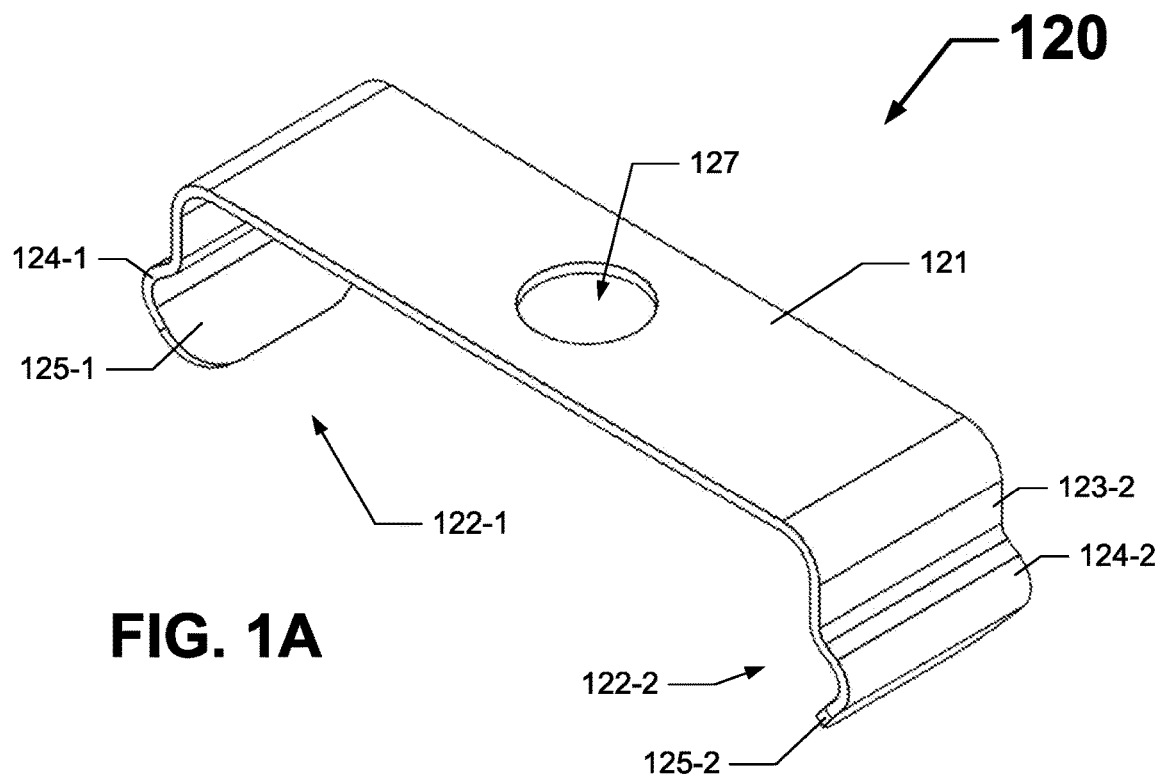
FIGS. 1A through 1D show various views of an engagement component of an engagement system for a recessed luminaire according to certain example embodiments.

In general, example embodiments provide systems, methods, and devices for engagement systems for recessed luminaires. Example embodiments can provide a number of benefits. Such benefits can include, but are not limited to, fewer parts to keep in inventory, modularity, user control, and simple configurability. Example embodiments can be used with new recessed luminaires or retrofit with existing recessed luminaires. Example embodiments described herein can be used with recessed luminaires having any of a number of sizes (e.g., 1 inch, 3 inches, 4 inches, 5 inches, 6 inches), any of a number of housing shapes (e.g., a cylinder, a rectangular cuboid), and any of a number of configurations (e.g., with a can, without a can, with a housing, without a housing). As used herein, a luminaire is a general term that can include a light fixture, a lighting device, an illumination fixture, and similar devices.

Recessed luminaires with example engagement systems can be located in one or more of any of a number of environments. Examples of such environments can include, but are not limited to, indoors, outdoors, a parking garage, a kitchen or cooking space, a hallway, an entertainment room, an office space, a manufacturing plant, a warehouse, and a storage facility, any of which can be climate-controlled or non-climate-controlled. In some cases, the example embodiments discussed herein can be used in any type of hazardous environment, including but not limited to an airplane hangar, a drilling rig (as for oil, gas, or water), a production rig (as for oil or gas), a refinery, a chemical plant, a power plant, a mining operation, a wastewater treatment facility, and a steel mill.

Recessed luminaires with example engagement systems can be integrated into any of a number of different structures. Such structures can include, but are not limited to, drywall, wood studs, concrete, and ceiling tile. A user may be any person that interacts with recessed luminaires. Examples of a user may include, but are not limited to, an engineer, an electrician, an instrumentation and controls technician, a mechanic, an operator, a property manager, a homeowner, a tenant, an employee, a consultant, a contractor, and a manufacturer's representative.

Recessed luminaires with example engagement systems (including portions thereof) can be made of one or more of a number of suitable materials to allow the recessed luminaire to meet certain standards and/or regulations while also maintaining durability in light of the one or more conditions under which the recessed luminaires and/or other associated components of the recessed luminaire can be exposed. Examples of such materials can include, but are not limited to, aluminum, stainless steel, fiberglass, glass, plastic, polymer, ceramic, and rubber.

Example engagement systems, or portions or components thereof, described herein can be made from a single piece (as from a mold, injection mold, die cast, or extrusion process). In addition, or in the alternative, example engagement systems (including portions or components thereof) can be made from multiple pieces that are mechanically coupled to each other. In such a case, the multiple pieces can be mechanically coupled to each other using one or more of a number of coupling methods, including but not limited to epoxy, welding, fastening devices, compression fittings, mating threads, snap fittings, and slotted fittings. One or more pieces that are mechanically coupled to each other can be coupled to each other in one or more of a number of ways, including but not limited to fixedly, hingedly, removably, slidably, and threadably.

Components and/or features described herein can include elements that are described as coupling, fastening, securing, abutting against, in communication with, or other similar terms. Such terms are merely meant to distinguish various elements and/or features within a component or device and are not meant to limit the capability or function of that particular element and/or feature. For example, a feature described as a "coupling feature" can couple, secure, fasten, abut against, and/or perform other functions aside from merely coupling.

A coupling feature (including a complementary coupling feature) as described herein can allow one or more components and/or portions of an example engagement system to become coupled, directly or indirectly, to one or more other components (e.g., a driver compartment, a housing, a frame) of a recessed luminaire and/or a structure (e.g., a stud, drywall, a beam). A coupling feature can include, but is not limited to, a clamp, a portion of a hinge, an aperture, a recessed area, a protrusion, a hole, a slot, a tab, a detent, and mating threads. One portion of an example engagement system can be coupled to a component (e.g., a driver compartment, a housing, a frame) of a recessed luminaire and/or a structure by the direct use of one or more coupling features.

In addition, or in the alternative, a portion of an example engagement system can be coupled to a component (e.g., a driver compartment, a housing, a frame, some other component) of a recessed luminaire and/or a structure using one or more independent devices that interact with one or more coupling features disposed on a component of the engagement system. Examples of such devices can include, but are not limited to, a pin, a hinge, a fastening device (e.g., a bolt, a screw, a rivet), epoxy, glue, adhesive, and a spring. One coupling feature described herein can be the same as, or different than, one or more other coupling features described herein. A complementary coupling feature as described herein can be a coupling feature that mechanically couples, directly or indirectly, with another coupling feature.

In the foregoing figures showing example embodiments of engagement systems for recessed luminaires, one or more of the components shown may be omitted, repeated, and/or substituted. Accordingly, example embodiments of engagement systems for recessed luminaires should not be considered limited to the specific arrangements of components shown in any of the figures. For example, features shown in one or more figures or described with respect to one embodiment can be applied to another embodiment associated with a different figure or description.

In certain example embodiments, recessed luminaires having example engagement systems are subject to meeting certain standards and/or requirements. For example, the National Electric Code (NEC), the National Electrical Manufacturers Association (NEMA), the International Electrotechnical Commission (IEC), the Federal Communication Commission (FCC), Underwriters Laboratories (UL), and the Institute of Electrical and Electronics Engineers (IEEE) set standards as to electrical enclosures, wiring, and electrical connections. Use of example embodiments described herein meet (and/or allow the recessed luminaire to meet) such standards when applicable.

If a component of a figure is described but not expressly shown or labeled in that figure, the label used for a corresponding component in another figure can be inferred to that component. Conversely, if a component in a figure is labeled but not described with respect to that figure, the description for such component can be substantially the same as the description for a corresponding component in another figure. The numbering scheme for the various components in the figures herein is such that each component is a three-digit number or a four-digit number, and corresponding components in other figures have the identical last two digits.

In addition, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

Example embodiments of engagement systems for recessed luminaires will be described more fully hereinafter with reference to the accompanying drawings, in which example embodiments of engagement systems for recessed luminaires are shown. Engagement systems for recessed luminaires may, however, be embodied in many different forms and should not be construed as limited to the example embodiments set forth herein. Rather, these example embodiments are provided so that this disclosure will be thorough and complete, and will fully convey the scope of engagement systems for recessed luminaires to those of ordinary skill in the art. Like, but not necessarily the same, elements (also sometimes called components) in the various figures are denoted by like reference numerals for consistency.

Terms such as "first", "second", "above", "below", "inner", "outer", "distal", "proximal", "end", "top", "bottom", "upper", "lower", "side", "left", "right", "front", "rear", and "within", when present, are used merely to distinguish one component (or part of a component or state of a component) from another. Such terms are not meant to denote a preference or a particular orientation. Such terms are not meant to limit embodiments of engagement systems for recessed luminaires. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Figure 1B:
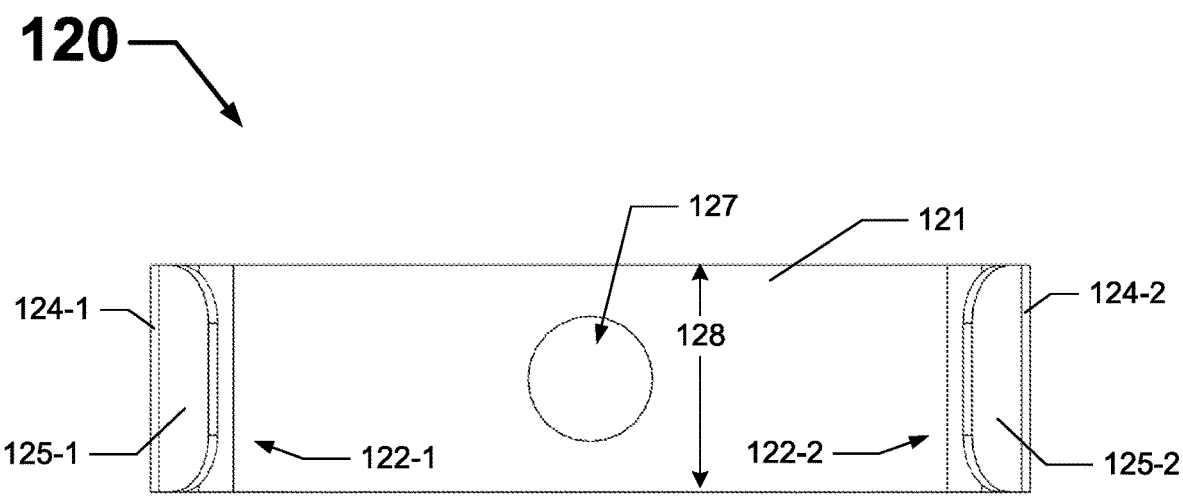
Figure 1C:
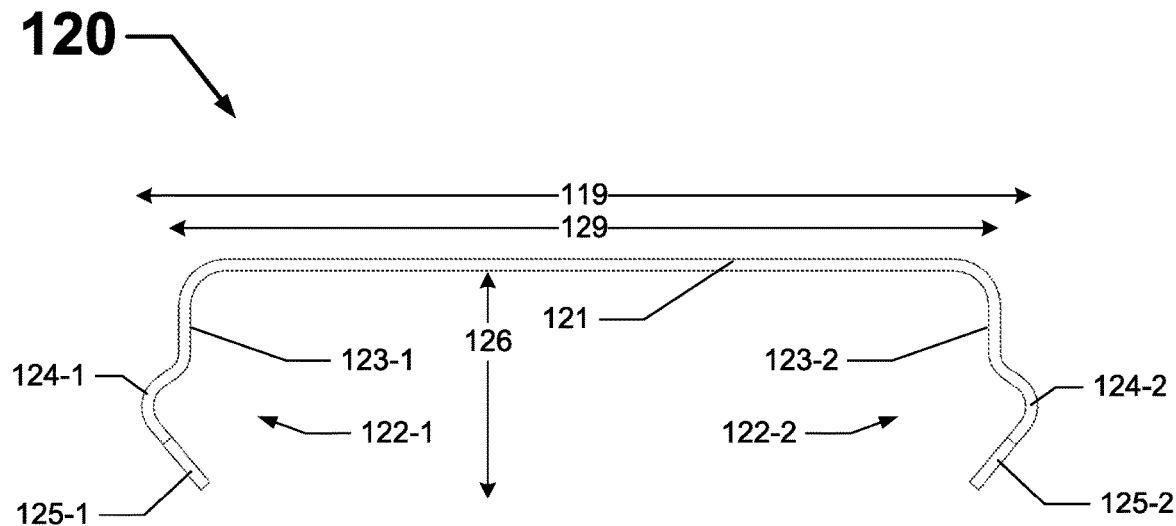
Figure 1D:
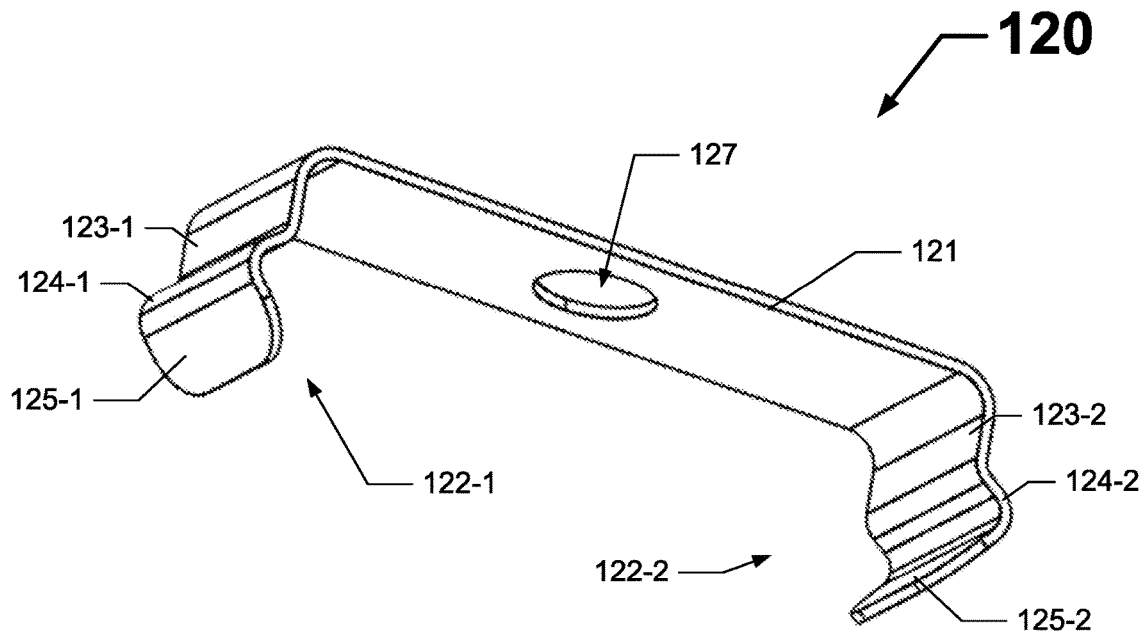

FIGS. 1A through 1C show various views of an engagement component 120 of an engagement system for a recessed luminaire according to certain example embodiments. Specifically, FIG. 1A shows a top perspective view of the engagement component 120. FIG. 1B shows a bottom view of the engagement component 120. FIG. 1C shows a side view of the engagement component 120. FIG. 1D shows a bottom perspective view of the engagement component 120. The example engagement component 120 can be configured to perform one or more of a number of functions with respect to the engagement system.

For example, the engagement component 120 can be configured to couple to a component (e.g., a driver compartment) of a recessed luminaire. The engagement component 120 of FIGS. 1A through 1D includes a body 121 (also sometimes called an engagement component body 121 herein). The body 121 in this case is substantially planar, having a length 129 and a width 128. Further, the body 121 can include one or more coupling features 127 that allow the engagement component 120 to become coupled, directly or indirectly, to a component of a recessed luminaire. In this example, the body 121 includes one coupling feature 127 in the form of a circular aperture that traverses the thickness of the body 121. As discussed below, the coupling feature 127 is configured to receive an independent coupling feature (e.g., a screw, a bolt, a rivet) that couples the engagement component 120 to a component of a recessed luminaire.

The engagement component 120 can also be configured to couple to and decouple from a bracket (discussed below) of the engagement system. In this example, engagement component 120 includes two bracket engagement extensions 122, where one bracket engagement extension 122-1 extends from one portion (e.g., an end) of the engagement component body 121, and the other bracket engagement extension 122-2 extends from another portion (e.g., an opposite end) of the engagement component body 121. In alternative embodiments, the engagement component 120 can have one bracket engagement extension or more than two bracket engagement extensions 122. When the engagement component 120 has multiple bracket engagement extensions 122, the bracket engagement extensions 122 can be arranged symmetrically around the engagement component body 121 (as in this case) or asymmetrically.

In certain example embodiments, the bracket engagement extension 122-1 and the bracket engagement extension 122-2 can be movable with respect to the engagement component body 121. For example, in this case, the engagement component 120 is configured as a generally U-shaped flat spring having a default position, as shown in FIGS. 1A through 1D. The engagement component body 121, one or more of the bracket engagement extensions 122, and/or the transitions therebetween can allow for some flex (e.g., compression, expansion) relative to the default position. When one or more portions of the engagement component 120 are compressed or expanded by the application of a force, those portions of the engagement component 120 return to its default position when the force is removed (or when the force is no longer sufficient to overcome the threshold force required to alter the shape of the engagement component 120 from its default position).

Each of the bracket engagement extensions 122 can have any of a number of configurations. For example, in this case, the bracket engagement extension 122-1 includes a proximal portion 123-1, a distal portion 125-1, and a protruding portion 124-1 located between the proximal portion 123-1 and the distal portion 125-1. The collection of the proximal portion 123-1, the distal portion 125-1, and the protruding portion 124-1 have an effective vertical distance 126 (also sometimes called the height 126 herein) from the engagement component body 121. The proximal portion 123-1 is substantially perpendicular (in a downward direction) to the engagement component body 121 at the left end of the engagement component body 121 along the length 129 of the engagement component body 121.

At the distal end of the proximal portion 123-1 is the protruding portion 124-1, which extends outward relative to the proximal portion 123-1. The protruding portion 124-1 is configured to abut against (or otherwise couple to) an engagement component receiving feature (discussed below) of a bracket of the engagement system. At the distal end of the protruding portion 124-1 extends the distal portion 125-1 of the bracket extension 122-1. In this case, the distal portion 125-1 is substantially planar. The distal portion 125-1 is configured to provide access to a user to manipulate the shape of the engagement component 120 from its default position.

The bracket engagement extension 122-2 in this example is configured substantially the same as the bracket engagement extension 122-1. Specifically, the bracket engagement extension 122-2 includes a proximal portion 123-2, a distal portion 125-2, and a protruding portion 124-2 located between the proximal portion 123-2 and the distal portion 125-2. The collection of the proximal portion 123-2, the distal portion 125-2, and the protruding portion 124-2 have the effective vertical distance 126 from the engagement component body 121. The proximal portion 123-2 is substantially perpendicular (in a downward direction) to the engagement component body 121 at the right end of the engagement component body 121 along the length 129 of the engagement component body 121.

At the distal end of the proximal portion 123-2 is the protruding portion 124-2, which extends outward relative to the proximal portion 123-2. The protruding portion 124-2 is configured to abut against (or otherwise couple to) an engagement component receiving feature (discussed below) of a bracket of the engagement system. At the distal end of the protruding portion 124-2 extends the distal portion 125-2 of the bracket extension 122-2. In this case, the distal portion 125-2 is substantially planar. The distal portion 125-2 is configured to provide access to a user to manipulate the shape of the engagement component 120 from its default position.

In certain example embodiments, in order to alter the shape of the engagement component 120 from its default position, opposing forces must be applied to multiple points of the engagement component 120. For example, in this case, the engagement component 120 can be compressed relative to its default position by simultaneously applying (e.g., by a user) an inward force to the distal portion 125-1 of the bracket engagement extension 122-1 and to the distal portion 125-2 of the bracket engagement extension 122-2. These inward forces must be sufficiently strong to overcome a minimum threshold value required to alter the engagement component 120 from its default position. When a sufficiently strong inward force is simultaneously applied to the distal portion 125-1 of the bracket engagement extension 122-1 and to the distal portion 125-2 of the bracket engagement extension 122-2, the protruding portion 124-1 of the bracket engagement extension 122-1 and the protruding portion 124-2 of the bracket engagement extension 122-2 simultaneously move inward, effectively reducing the overall length 119 of the engagement component as the forces are applied.

Figure 2A:
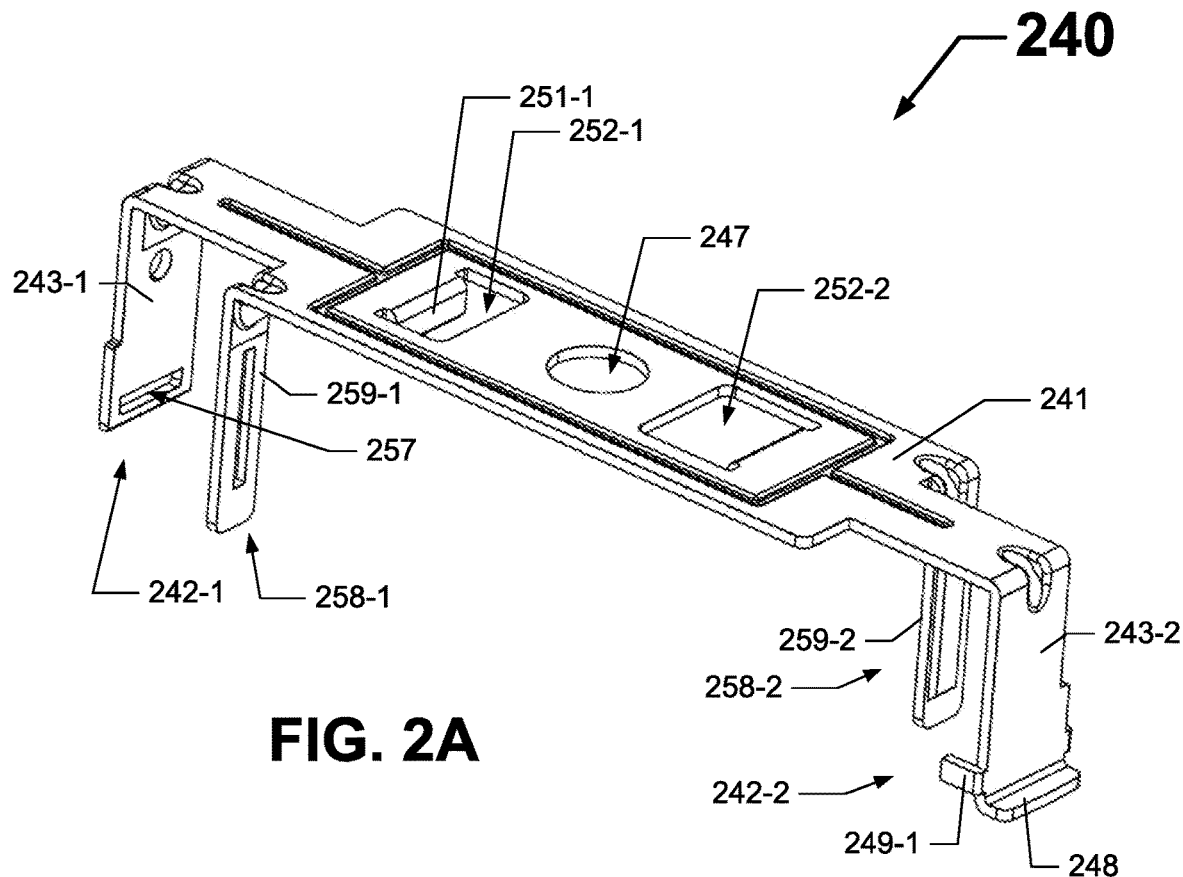
FIGS. 2A through 2D show various views of a bracket of an engagement system for a recessed luminaire according to certain example embodiments.
Figure 2B:
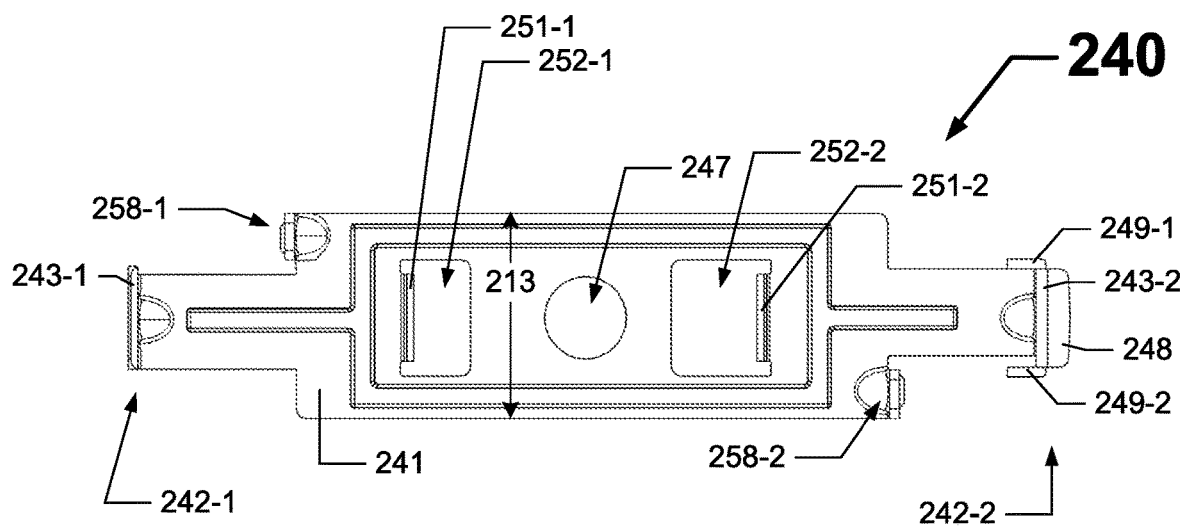
Figure 2C:
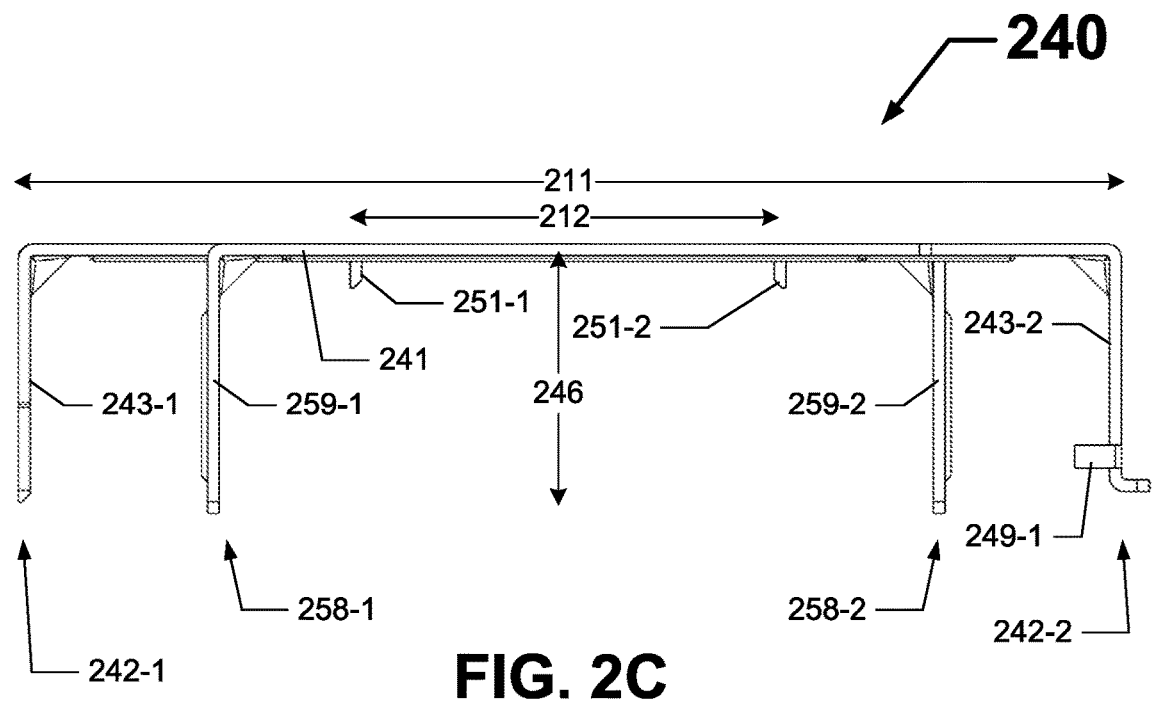
Figure 2D:
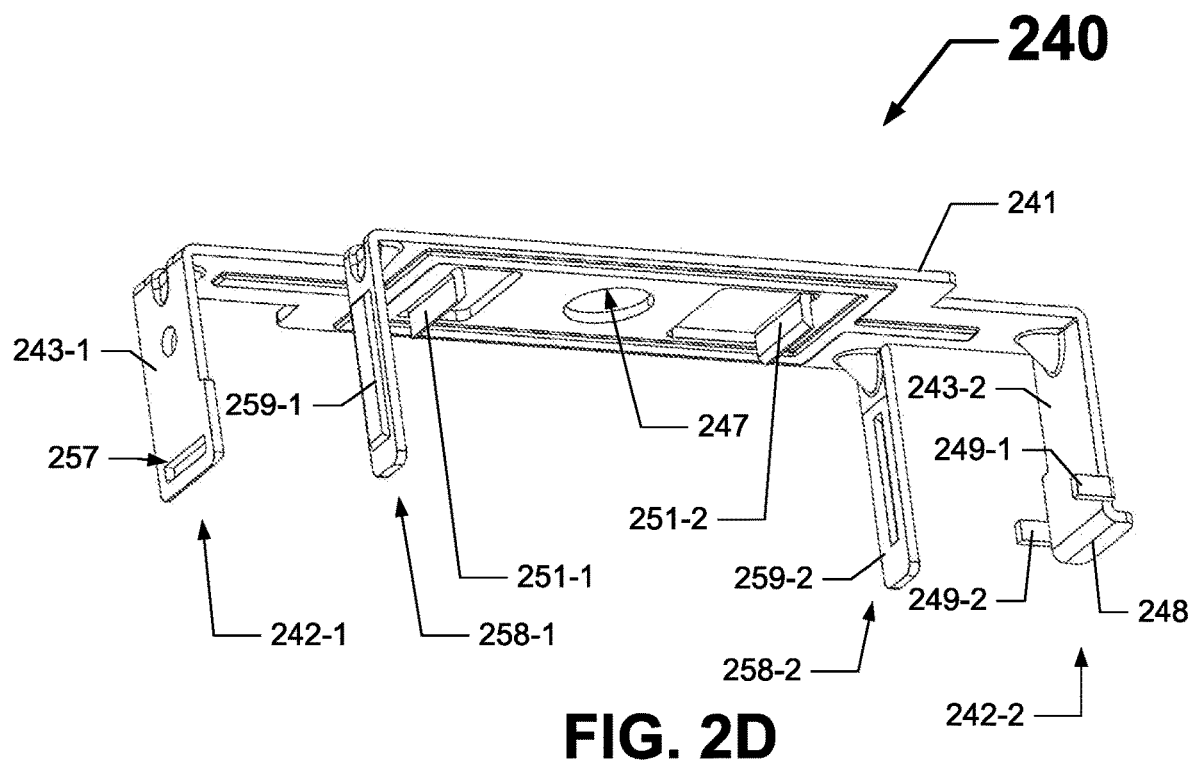

FIGS. 2A through 2D show various views of a bracket 240 of an engagement system for a recessed luminaire according to certain example embodiments. Specifically, FIG. 2A shows a top perspective view of the bracket 240. FIG. 2B shows a bottom view of the bracket 240. FIG. 2C shows a side view of the bracket 240. FIG. 2D shows a bottom perspective view of the bracket 240. Referring to FIGS. 1A through 2D, the example bracket 240 can be configured to perform one or more of a number of functions with respect to the engagement system.

For example, the bracket 240 can be configured to couple to a component (e.g., a top plate) of a recessed luminaire and/or a structure (e.g., a frame, a stud, drywall) to which a recessed luminaire can be mounted. The bracket 240 of FIGS. 2A through 2D includes a body 241 (also sometimes called a bracket body 241 herein). The body 241 in this case is substantially planar, having a length 211 and a width 213. In this example, the body 241 includes one coupling feature 247 in the form of a circular aperture that traverses the thickness of the body 241. As discussed below, the coupling feature 247 is configured to receive an independent coupling feature (e.g., a screw, a bolt, a rivet) to couple the engagement component 120 to a component (e.g., a driver compartment) of a recessed luminaire. In some cases, the coupling feature 247 can be configured to be aligned with the coupling feature 127 of the engagement component body 121 when the engagement component 120 is coupled to the bracket 240.

The bracket 240 can also be configured to couple to and decouple from the engagement component 120 of the engagement system. Specifically, the bracket 240 can include one or more engagement component receiving features 252, where each engagement component receiving feature 252 is configured to engage one or more of the bracket engagement extensions 122 of the engagement component 120. In this example, the bracket 240 includes two engagement component receiving features 252 in the form of an aperture that traverses the thickness of the body 241 of the bracket 240. In some cases, such a configuration can be described as a single engagement component receiving feature 252 with two parts (engagement component receiving feature 252-1 and engagement component receiving feature 252-2). One engagement component receiving feature 252-1 is located on one side of the coupling feature 247, and the other engagement component receiving feature 252-2 is located on the other side of the coupling feature 247.

Each engagement component receiving feature 252 of the bracket 240 can have any of a number of different configurations. As discussed above, in this case, each engagement component receiving feature 252 is in the form of a rectangular aperture, where the size of the aperture of engagement component receiving feature 252-1 is smaller than the size of the aperture of engagement component receiving feature 252-2. In alternative embodiments, the size of the apertures of the of engagement component receiving features 252 can be substantially the same as each other. Also, while the shape of the apertures of the of engagement component receiving features 252 in this case is substantially rectangular, in alternative embodiments the shape of one or both of the apertures can have some other shape (e.g., oval, circular, random).

In addition, in this case, each engagement component receiving feature 252 of the bracket 240 includes a stop 251 that extends downward from the bottom surface of the body 241. Specifically, the engagement component receiving feature 252-1 includes a stop 251-1 positioned along the boundary of the engagement component receiving feature 252-1 furthest from the coupling feature 247, and the engagement component receiving feature 252-2 includes a stop 251-2 positioned along the boundary of the engagement component receiving feature 252-2 furthest from the coupling feature 247. Stop 251-1 and stop 251-2 are separated from each other by a distance 212. Each stop 251 is configured to abut against, couple to, or otherwise engage part (e.g., a protruding portion 124) of a bracket engagement extension 122 of the engagement component 120 when the engagement component 120 is in a default position.

In some cases, one or more of the engagement component receiving features 252 is formed by peeling back part of the bracket body 241 in a downward direction. The number of engagement component receiving features 252 and the configuration of each engagement component receiving feature 252 of the bracket 240 can be designed to complement the number of bracket engagement extensions 122 and the configuration of each bracket engagement extension 122 of the engagement component 120.

The one or more engagement component receiving features 252 of the bracket 240 can be configured to allow the bracket engagement extensions 122 of the engagement component 120 to be coupled to and decoupled from the one or more engagement component receiving features 252. Specifically, in this case, as discussed below with respect to FIGS. 3A through 3D, the engagement component 120 is able to couple to and decouple from the bracket 240 when the bracket engagement extension 122-1 and the bracket engagement extension 122-2 are moved with respect to the engagement component body 121, which changes the shape of the engagement component 120 from a default position and allows the bracket engagement extensions 122 to engage with and/or disengage from the engagement component receiving features 252 of the bracket 240.

In certain example embodiments, the bracket 240 can include one or more additional component coupling features 242 that allow the bracket 240 to become coupled, directly or indirectly, to another component (e.g., a top plate) of a recessed luminaire and/or a structure to which a recessed luminaire is coupled. In this example, the bracket 240 includes two additional component coupling features 242. Additional component coupling feature 242-1 extends from one portion (e.g., an end) of the bracket body 241 of the bracket 240, and additional component coupling feature 242-2 extends from another portion (e.g., an opposite end) of the bracket body 241 of the bracket 240.

In certain example embodiments, the additional component coupling feature 242-1 and the additional component coupling feature 242-2 can be substantially rigid with respect to the bracket body 241 of the bracket 240. For example, in this case, the bracket body 241 and the two additional component coupling features 242 of the bracket 240 are configured to form a general U-shape, as shown in FIGS. 2A through 2D.

Each of the additional component coupling features 242 can have any of a number of configurations to allow the bracket 240 to abut against, couple to, or otherwise engage an additional component (e.g., a top plate, a frame) of a recessed luminaire or a structure to which a recessed luminaire is mounted. For example, in this case, the additional component coupling feature 242-1 can include a slot 257 (also called an additional component coupling feature herein) that traverses an extension 243-1 of the additional component coupling feature 242-1. As another example, in this case, the additional component coupling feature 242-2 can include a curved distal end 248 (also called an additional component coupling feature herein) of an extension 243-2 of the additional component coupling feature 242-2. As yet another example, the additional component coupling feature 242-2 can include one or more protrusions 249 (also called an additional component coupling feature herein) that extend substantially perpendicular to the extension 243-2 proximate to where the curved distal end 248 begins. In this case, there are two protrusions 249 (protrusion 249-1 and protrusion 249-2).

Each additional component coupling feature 242 has a height 246 that is large enough to allow for a user to access the space underneath the bracket body 241. The height 246 of the additional component coupling features 242 can be larger than the effective vertical distance 126 of the engagement component 120. When there are multiple additional component coupling features 242, the height 246 of one additional component coupling feature 242 can be the same as or different than the height of one or more of the other additional component coupling features 242. The configuration of each additional component coupling feature 242 can be designed to complement the configuration of the additional component that engages the additional component coupling feature 242.

Each additional component coupling feature 242 in this example is substantially perpendicular (in a downward direction) to the bracket body 241. In such a case, the height 246 of the additional component coupling features 242 is the same as the height of the bracket 240. In alternative embodiments, one or more of the additional component coupling features 242 can be at some other angle relative to the bracket body 241. In such cases, the length of the additional component coupling features 242 can be greater than the effective height 246 of the bracket 240.

In certain example embodiments, the bracket 240 can include one or more support extensions 258 that allow the bracket 240 to become stabilized when the additional component coupling features 242 are engaged with another component (e.g., a top plate) of a recessed luminaire and/or a structure to which a recessed luminaire is coupled. In this example, the bracket 240 includes two support extensions 258. Support extension 258-1 extends from one portion (e.g., a side) of the bracket body 241 of the bracket 240, and support extension 258-2 extends from another portion (e.g., an opposite side) of the bracket body 241 of the bracket 240.

Each support extension 258 is configured to abut against (or otherwise engage) the component (e.g., a top plate) of the recessed luminaire that and/or the structure that is engaged by the one or more additional component coupling features 242. Each support extension 258 can have any of a number of configurations. For example, in this case, support extension 258-1 has a body 259-1 having a length that substantially equals the height 246 of the bracket 240, and support extension 258-2 has a body 259-1 having the length that substantially equals the height 246 of the bracket 240. When the bracket 240 has multiple support extensions 258, as in this case, the configuration of one support extension 258 can be the same as, or different than, the configuration of one or more of the other support extensions 258. In this case, none of the support extensions 258 include any coupling features (e.g., apertures, slots, tabs), but in alternative embodiments, one or more of the support extensions 258 can include a coupling feature.

In this case, the support extensions 258 extend substantially perpendicular from the bracket body 241 so that the support extensions 258 are substantially parallel to each other and to the additional component coupling features 242. In alternative, one or more of the support extensions 258 can form some other non-perpendicular angle with the bracket body 241. Also, the body 259 of each support extension 258 in this case is substantially planar along its entire length. In alternative embodiments, the body 259 of one or more of the support extensions 258 can have a curve, bend, and/or other feature along its length.

Figure 3A:
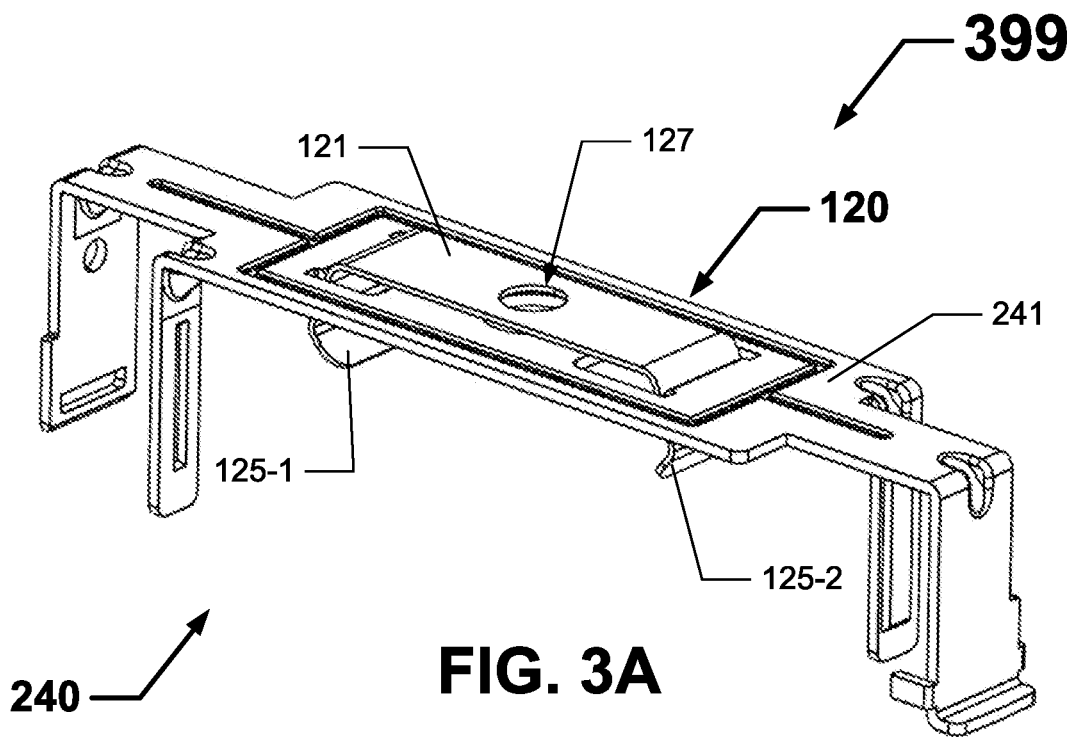
FIGS. 3A through 3D show an engagement system that includes the engagement component of FIGS. 1A through 1C and the bracket of FIGS. 2A through 2D according to certain example embodiments.
Figure 3B:
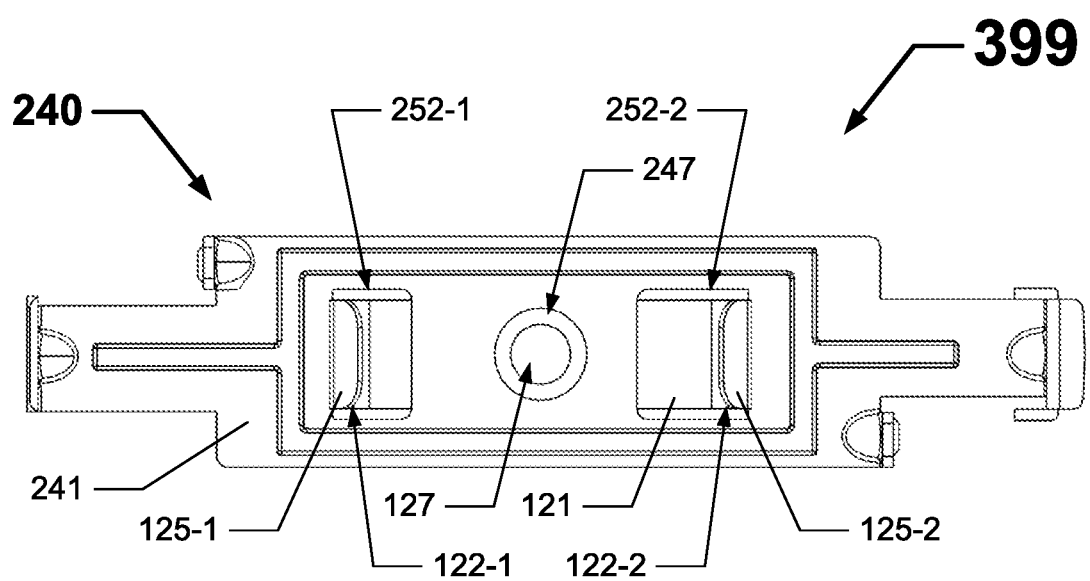
Figure 3C:
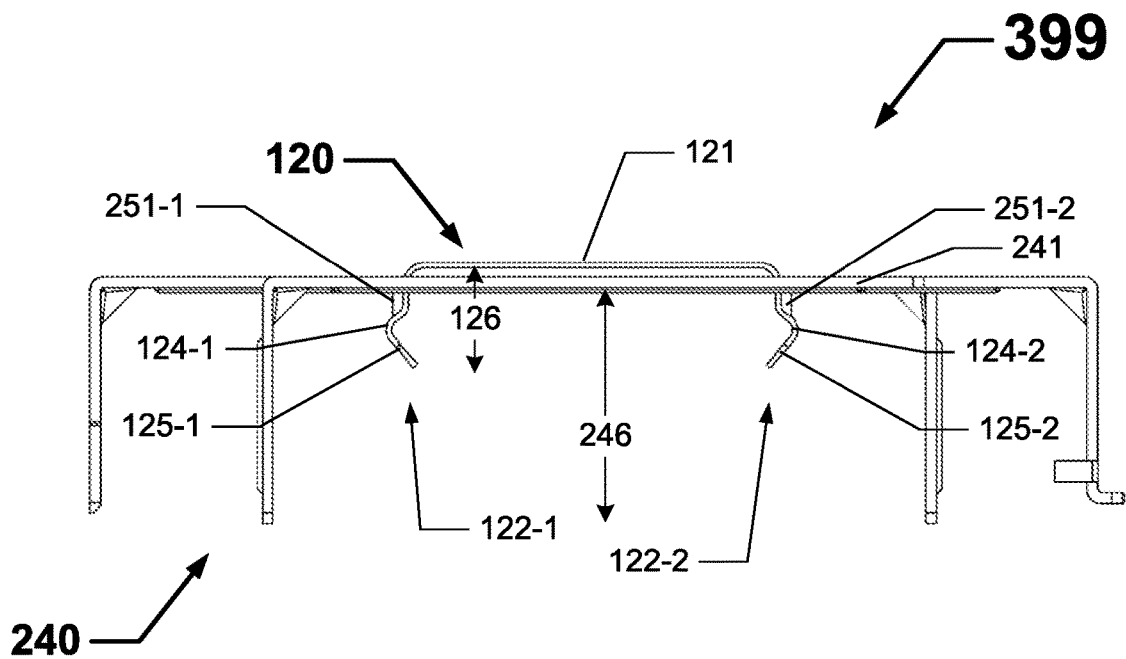
Figure 3D:
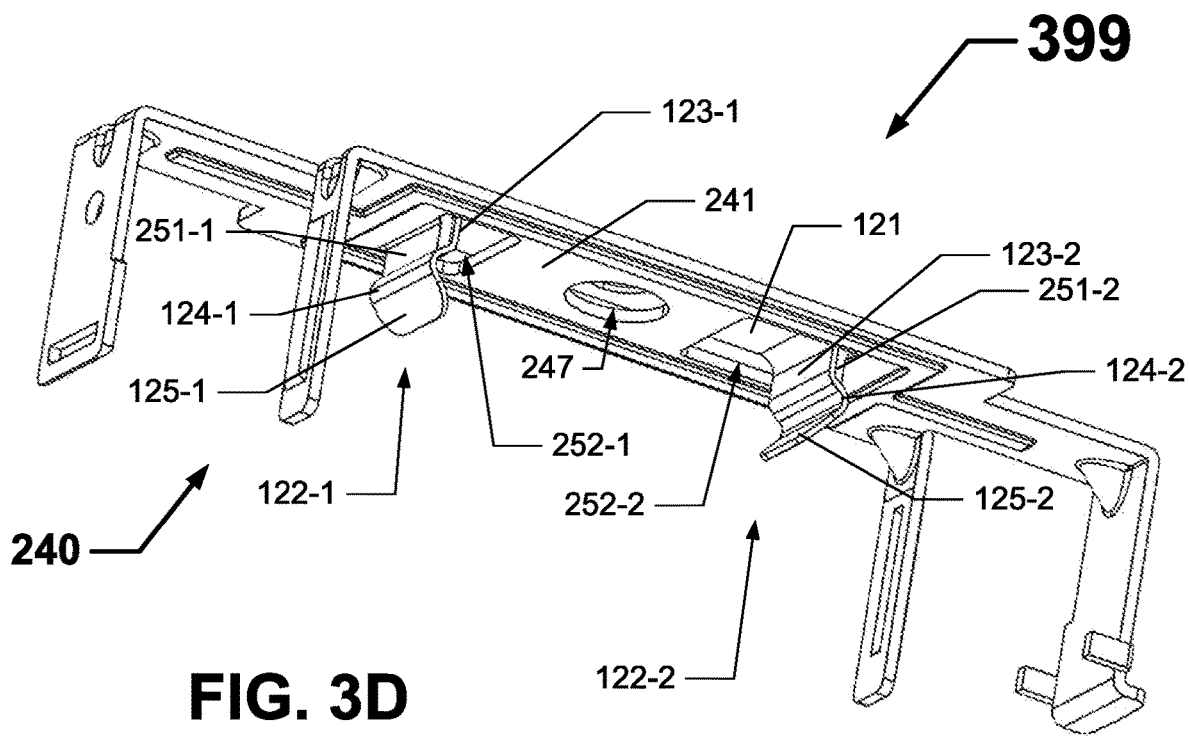

FIGS. 3A through 3D show an engagement system 399 that includes the engagement component 120 of FIGS. 1A through 1C and the bracket 240 of FIGS. 2A through 2D according to certain example embodiments. Specifically, FIG. 3A shows a top perspective view of the engagement system 399. FIG. 3B shows a bottom view of the engagement system 399. FIG. 3C shows a side view of the engagement system 399. FIG. 3D shows a bottom perspective view of the engagement system 399.

Referring to FIGS. 1A through 3D, the engagement system 399 shown in FIGS. 3A through 3D has the engagement component 120 coupled to the bracket 240. Specifically, when the engagement component 120 is coupled to the bracket 240, the proximal portion 123-1 of the bracket engagement extension 122-1 abuts against the front surface of the stop 251-1 of the engagement component receiving feature 252-1, the top part of the protruding portion 124-1 of the bracket engagement extension 122-1 abuts against the distal surface of the stop 251-1 of the engagement component receiving feature 252-1, and the distal portion 125-1 of the bracket engagement extension 122-1 is accessible within the space formed underneath the bracket body 241 of the bracket 240 because the height 246 of the bracket 240 is significantly larger than the height 126 of the engagement component 120.

Similarly, when the engagement component 120 coupled to the bracket 240, the proximal portion 123-2 of the bracket engagement extension 122-2 abuts against the front surface of the stop 251-2 of the engagement component receiving feature 252-2, the top part of the protruding portion 124-2 of the bracket engagement extension 122-2 abuts against the distal surface of the stop 251-2 of the engagement component receiving feature 252-2, and the distal portion 125-2 of the bracket engagement extension 122-2 is accessible within the space formed underneath the bracket body 241 of the bracket 240 because the height 246 of the bracket 240 is significantly larger than the height 126 of the engagement component 120.

When the engagement component 120 is coupled to the bracket 240, the coupling feature 127 that traverses the thickness of the engagement component body 121 and the coupling feature 247 that traverses the thickness of the bracket body 241 are aligned with each other. Further, the diameter of the coupling feature 247 that traverses the thickness of the bracket body 241 is larger than the diameter of the coupling feature 127 that traverses the thickness of the engagement component body 121. In this way, an independent coupling feature (e.g., a screw, a rivet, a nut) can be of a size to engage the coupling feature 127 but not the larger coupling feature 247. This allows a user to access the independent coupling feature through the coupling feature 247 in the bracket 240 and/or to allow the top portion of the independent coupling feature to extend downward from the engagement component body 121 without contacting the bracket body 241. In the latter case, in alternative embodiments, rather than a coupling feature 247, the bracket body 241 can have some other feature (e.g., a protrusion, a slot) or no feature. In yet other alternative embodiments, the diameter of the coupling feature 247 in the bracket 240 can be substantially the same as the diameter of the coupling feature 127 of the engagement component 120. In such cases, an independent coupling feature can be used to couple the bracket 240 and the engagement component 120 to each other and to a driver compartment, junction box, or other component of a recessed luminaire.

The engagement component 120 as shown in FIGS. 3A through 3D can either be in a default position or under slight tension (where the default position is slightly expanded so that there is a larger separation between the distal portion 125-1 of the bracket engagement extension 122-1 and the distal portion 125-2 of the bracket engagement extension 122-2). To decouple the engagement component 120 from the bracket 240, a sufficiently large inward force must be applied simultaneously to the distal portion 125-1 of the bracket engagement extension 122-1 and to the distal portion 125-2 of the bracket engagement extension 122-2.

When this occurs, the protruding portion 124-1 of the bracket engagement extension 122-1 and the protruding portion 124-2 of the bracket engagement extension 122-2 are also moved inward, causing the proximal portion 123-1 and the protruding portion 124-1 of the bracket engagement extension 122-1 to stop abutting against the front surface and the distal surface, respectively, of the stop 251-1 of the engagement component receiving feature 252-1, and also simultaneously causing the proximal portion 123-2 and the protruding portion 124-2 of the bracket engagement extension 122-2 to stop abutting against the front surface and the distal surface, respectively, of the stop 251-2 of the engagement component receiving feature 252-2.

At that point, with the inward forces continuing to be applied to the distal portions 125 of the bracket engagement extensions 122, the engagement component 120 can be moved upward until the protruding portion 124-1 of the bracket engagement extension 122-1 clears (is raised above) the engagement component receiving feature 252-1 and the protruding portion 124-2 of the bracket engagement extension 122-2 clears (is raised above) the engagement component receiving feature 252-2. From there, regardless of whether the inward forces continue to be applied to the distal portions 125 of the bracket engagement extensions 122, the engagement component 120 can continue to be moved upward until the distal portion 125-1 of the bracket engagement extension 122-1 clears the engagement component receiving feature 252-1 and the distal portion 125-2 of the bracket engagement extension 122-2 clears the engagement component receiving feature 252-2.

In order to couple the engagement component 120 and the bracket 240 to each other, the reverse process can generally take place. In other words, regardless of whether the inward forces continue to be applied to the distal portions 125 of the bracket engagement extensions 122, the engagement component 120 can be positioned above the bracket 240 and moved downward until the distal portion 125-1 of the bracket engagement extension 122-1 enters the engagement component receiving feature 252-1 and the distal portion 125-2 of the bracket engagement extension 122-2 enters the engagement component receiving feature 252-2.

From there, with sufficiently strong inward forces applied to the distal portions 125 of the bracket engagement extensions 122, the engagement component 120 can continue to be moved downward until the protruding portion 124-1 of the bracket engagement extension 122-1 is positioned below the stop 251-1 of the engagement component receiving feature 252-1 and the protruding portion 124-2 of the bracket engagement extension 122-2 is positioned below the stop 251-2 of the engagement component receiving feature 252-2.

In some cases, as when the bottom parts of the protruding portions 124 of the bracket engagement extensions 122 are sloped, there is no need to apply inward forces to the distal portions 125 of the bracket engagement extensions 122 as the engagement component 120 is moved downward because the sloped protruding portions 124 can cause the bracket engagement extensions 122 to move inward as the sloped protruding portions 124 slide downward against the inside surface of the stops 251 until the outermost part of the protruding portions 124 abut against the inside surface of the stops 251. Once the outermost part of the protruding portions 124 pass below the stops 251, the bracket engagement extensions 122 can expand to their default positions, which forces the outermost part of the protruding portions 124 to extend beyond the distal end of the stops 251. In any case, the coupling and decoupling between the bracket 240 and the engagement component 120 can be performed without the use of tools.

Figure 4A:
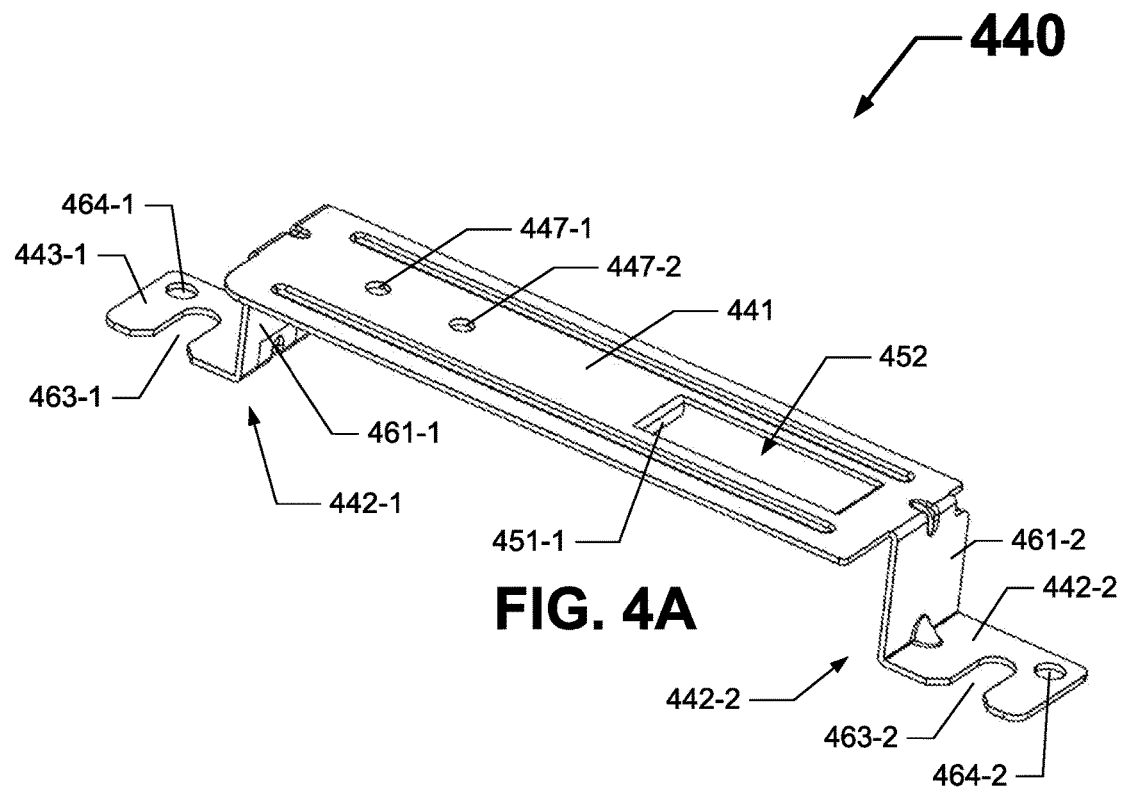
FIGS. 4A through 4D show various views of another bracket of an engagement system for a recessed luminaire according to certain example embodiments.
Figure 4B:
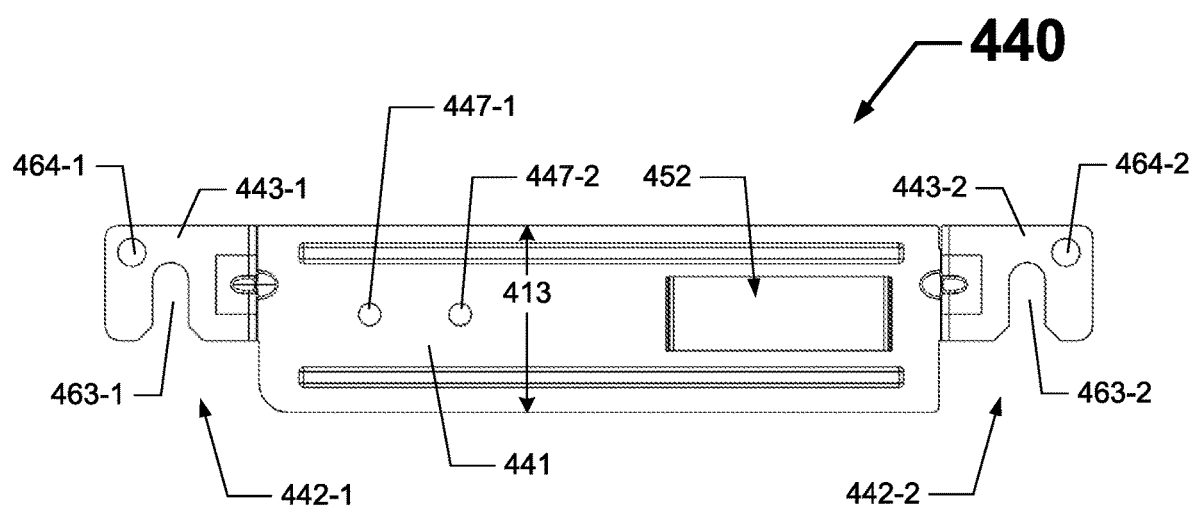
Figure 4C:
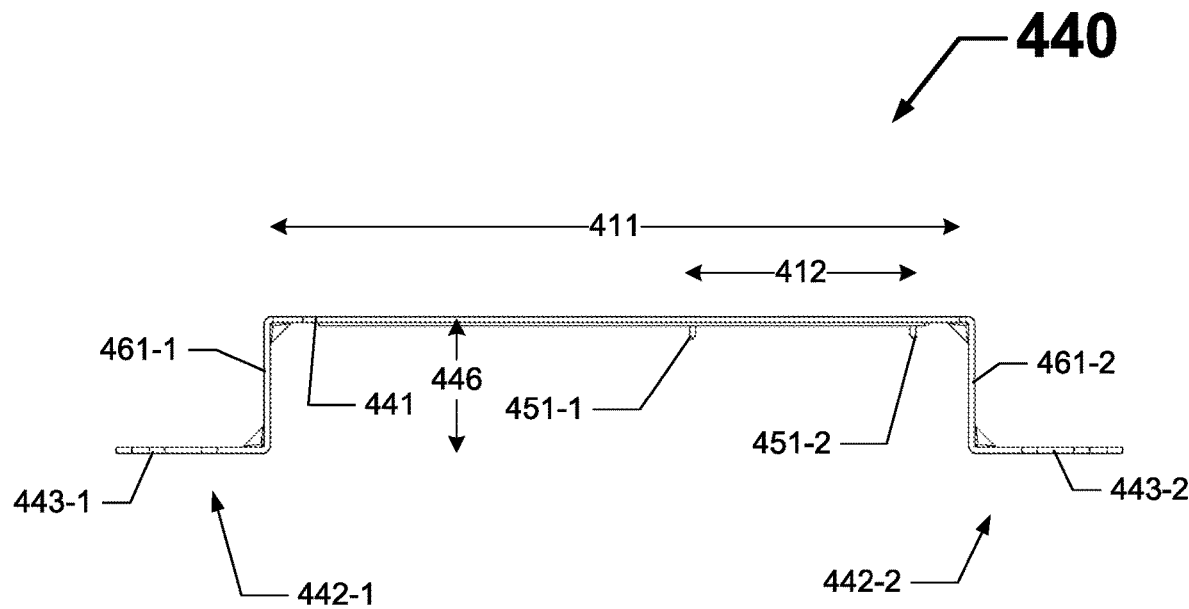
Figure 4D:
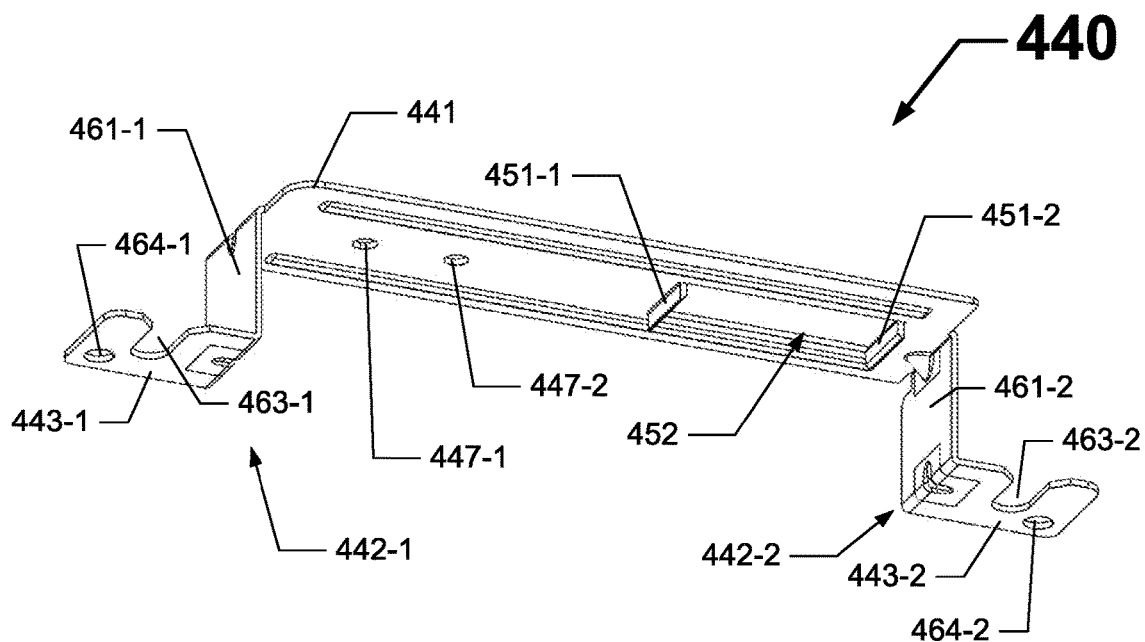

FIGS. 4A through 4D show various views of another bracket 440 of an engagement system for a recessed luminaire according to certain example embodiments. Specifically, FIG. 4A shows a top perspective view of the bracket 440. FIG. 4B shows a top view of the bracket 440. FIG. 4C shows a side view of the bracket 440. FIG. 4D shows a bottom perspective view of the bracket 440. Referring to FIGS. 1A through 4D, the example bracket 440 (including portions thereof) can be substantially the same as the bracket 240 (including corresponding portions thereof) discussed above with respect to FIGS. 2A through 3D, except as described below.

The bracket 440 can be configured to perform one or more of a number of functions with respect to the engagement system. For example, the bracket 440 can be configured to couple to a component (e.g., a top plate) of a recessed luminaire and/or a structure (e.g., a frame, a stud, drywall) to which a recessed luminaire can be mounted. The bracket 440 of FIGS. 4A through 4D includes a body 441 (also sometimes called a bracket body 441 herein). The body 441 in this case is substantially planar, having a length 411 and a width 413. In this example, the body 441 includes two coupling features 447 (coupling feature 447-1 and coupling feature 447-2) in the form of circular apertures that traverses the thickness of the body 441. As discussed below, the coupling features 447 are configured to receive an independent coupling feature (e.g., a screw, a bolt, a rivet) to couple the engagement component 120 to a component (e.g., a driver compartment) of a recessed luminaire.

The bracket 440 can also be configured to couple to and decouple from the engagement component 120 of the engagement system. Specifically, the bracket 440 can include one or more engagement component receiving features 452, where each engagement component receiving feature 452 is configured to engage one or more of the bracket engagement extensions 122 of the engagement component 120. In this example, the bracket 440 includes one engagement component receiving feature 452 in the form of a rectangular aperture that traverses the thickness of the body 441 of the bracket 440. In this case, the engagement component receiving feature 452 is located proximate to the right end of the body 441 and the additional component coupling feature 442-2. In alternative embodiments, the engagement component receiving feature 452 can be positioned at any other point along the body 441 of the bracket 440.

The engagement component receiving feature 452 of the bracket 440 can have any of a number of different configurations. As discussed above, in this case, the engagement component receiving feature 452 is in the form of a rectangular aperture 452, where the size of the aperture is substantially the same as the outer perimeter of the engagement component 120 when the engagement component 120 is in a compressed position. In alternative embodiments, the aperture can have any of a number of other sizes and/or shapes (e.g., oval, circular, random).

In addition, in this case, the engagement component receiving feature 452 of the bracket 440 includes two stops 451 (stop 451-1 and stop 451-2) that are positioned on opposite ends of the aperture and that extend downward from the bottom surface of the body 441. Specifically, the engagement component receiving feature 452 includes a stop 451-1 positioned along the boundary of the aperture closest to the additional component coupling feature 442-1 and another stop 451-2 positioned along the boundary of the aperture closes to the additional component coupling feature 442-2. Stop 451-1 and stop 451-2 are separated from each other by a distance 412. Each stop 451 is configured to abut against, couple to, or otherwise engage part (e.g., a protruding portion 124) of a bracket engagement extension 122 of the engagement component 120 when the engagement component 120 is in a default position.

In some cases, the engagement component receiving feature 452 is formed by peeling back part of the bracket body 441 in a downward direction. The number of engagement component receiving features 452 and the configuration of each engagement component receiving feature 452 of the bracket 440 can be designed to complement the number of bracket engagement extensions 122 and the configuration of each bracket engagement extension 122 of the engagement component 120.

The engagement component receiving feature 452 of the bracket 440 can be configured to allow the bracket engagement extensions 122 of the engagement component 120 to be coupled to and decoupled from the engagement component receiving feature 452. Specifically, in this case, as discussed below with respect to FIGS. 5A through 5C, the engagement component 120 is able to couple to and decouple from the bracket 440 when the bracket engagement extension 122-1 and the bracket engagement extension 122-2 are moved with respect to the engagement component body 121, which changes the shape of the engagement component 120 from a default position and allows the bracket engagement extensions 122 to engage with and/or disengage from the engagement component receiving feature 452 of the bracket 440.

In certain example embodiments, the bracket 440 can include one or more additional component coupling features 442 that allow the bracket 440 to become coupled, directly or indirectly, to another component (e.g., a top plate) of a recessed luminaire and/or a structure to which a recessed luminaire is coupled. In this example, the bracket 440 includes two additional component coupling features 442. Additional component coupling feature 442-1 extends from one portion (e.g., an end) of the bracket body 441 of the bracket 440, and additional component coupling feature 442-2 extends from another portion (e.g., an opposite end) of the bracket body 441 of the bracket 440.

In certain example embodiments, the additional component coupling feature 442-1 and the additional component coupling feature 442-2 can be substantially rigid with respect to the bracket body 441 of the bracket 440. For example, in this case, the bracket body 441 and the two additional component coupling features 442 of the bracket 440 are configured to form a general U-shape, as shown in FIGS. 4A through 4D.

Each of the additional component coupling features 442 can have any of a number of configurations to allow the bracket 440 to abut against, couple to, or otherwise engage an additional component (e.g., a top plate, a frame) of a recessed luminaire or a structure to which a recessed luminaire is mounted. For example, in this case, the additional component coupling feature 442-1 can include a body 461-1 that extends in a direction (e.g., downward) and at an angle (e.g., 90°) from a portion (e.g., an end) of the bracket body 441. The additional component coupling feature 442-1 can have an extension 443-1 that extends in a direction (e.g., outward) and at an angle (e.g., 90°) from the distal end of the body 461-1. The extension 443-1 can include one or more coupling features. For example, in this case, the extension 443-1 can include a coupling feature 463-1 in the form of a slot that traverses the thickness of the extension 443-1 and originates at a side of the extension 443-1. As another example, in this case, the extension 443-1 can include a coupling feature 464-1 in the form of a circular aperture that traverses the thickness of the extension 443-1.

Similarly, the additional component coupling feature 442-2 can include a body 461-2 that extends in a direction (e.g., downward) and at an angle (e.g., 90°) from a portion (e.g., an end) of the bracket body 441. The additional component coupling feature 442-2 can have an extension 443-2 that extends in a direction (e.g., outward) and at an angle (e.g., 90°) from the distal end of the body 461-2. The extension 443-2 can include one or more coupling features. For example, in this case, the extension 443-2 can include a coupling feature 463-2 in the form of a slot that traverses the thickness of the extension 443-2 and originates at a side of the extension 443-2. As another example, in this case, the extension 443-2 can include a coupling feature 464-2 in the form of a circular aperture that traverses the thickness of the extension 443-2.

In this case, the additional component coupling feature 442-1 and the additional component coupling feature 442-2 are configured substantially the same as each other. In alternative embodiments, one or more characteristics (e.g., height 446, angle between the body 461 and the extension 443, coupling features on the extension 443) of one additional component coupling feature 442 can be different than one or more corresponding characteristics of the other additional component coupling feature 442. In this case, there are two additional component coupling features 442. In alternative embodiments, there can be one additional component coupling feature 442 or more than two additional component coupling features 442.

Each additional component coupling feature 442 has a height 446 that is large enough to allow for a user to access the space underneath the bracket body 441. The height 446 of the additional component coupling features 442 can be larger than the effective vertical distance 126 of the engagement component 120. When there are multiple additional component coupling features 442, the height 446 of one additional component coupling feature 442 can be the same as or different than the height of one or more of the other additional component coupling features 442. The configuration of each additional component coupling feature 442 can be designed to complement the configuration of the additional component that engages the additional component coupling feature 442.

Each additional component coupling feature 442 in this example is substantially perpendicular (in a downward direction) to the bracket body 441. In such a case, the height 446 of the additional component coupling features 442 is the same as the height of the bracket 440. In alternative embodiments, one or more of the additional component coupling features 442 can be at some other angle relative to the bracket body 441. In such cases, the length of the additional component coupling features 442 can be greater than the effective height 446 of the bracket 440.

In this case, the bracket 440 does not include any support extensions, such as the support extensions 258 of FIGS. 2A through 2D. In alternative embodiments, the bracket 440 can include one or more support extensions that allow the bracket 440 to become stabilized when the additional component coupling features 442 are engaged with (e.g., coupled to) another component (e.g., a top plate) of a recessed luminaire and/or a structure to which a recessed luminaire is coupled.

Figure 5A:
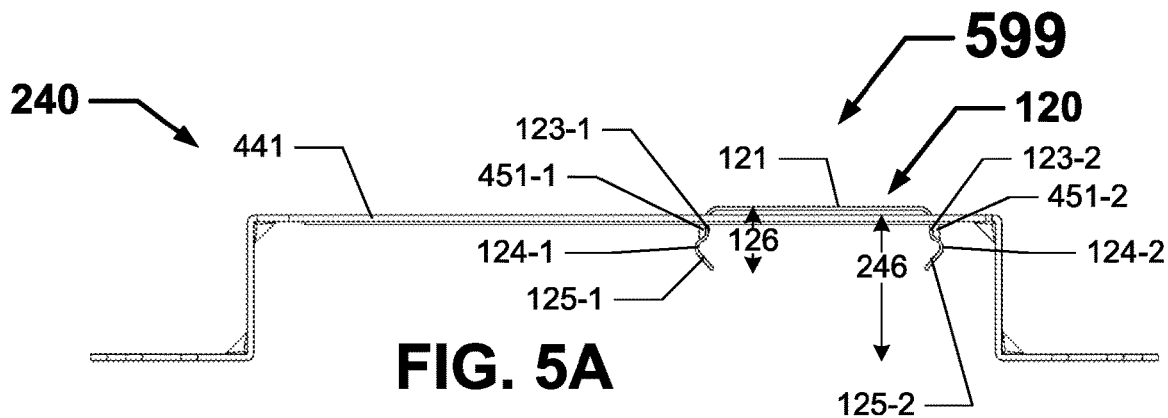
FIGS. 5A through 5C show an engagement system that includes the engagement component of FIGS. 1A through 1C and the bracket of FIGS. 4A through 4D according to certain example embodiments.
Figure 5B:
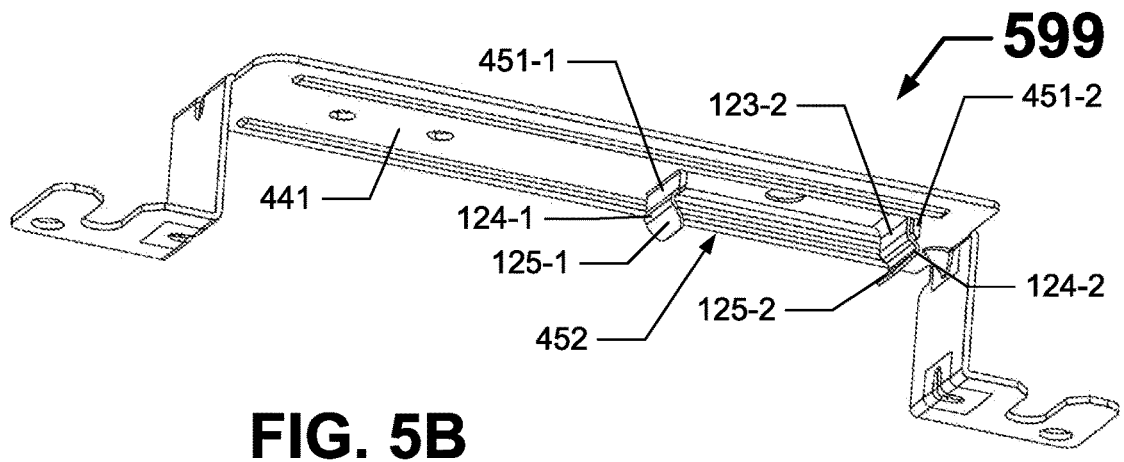
Figure 5C:
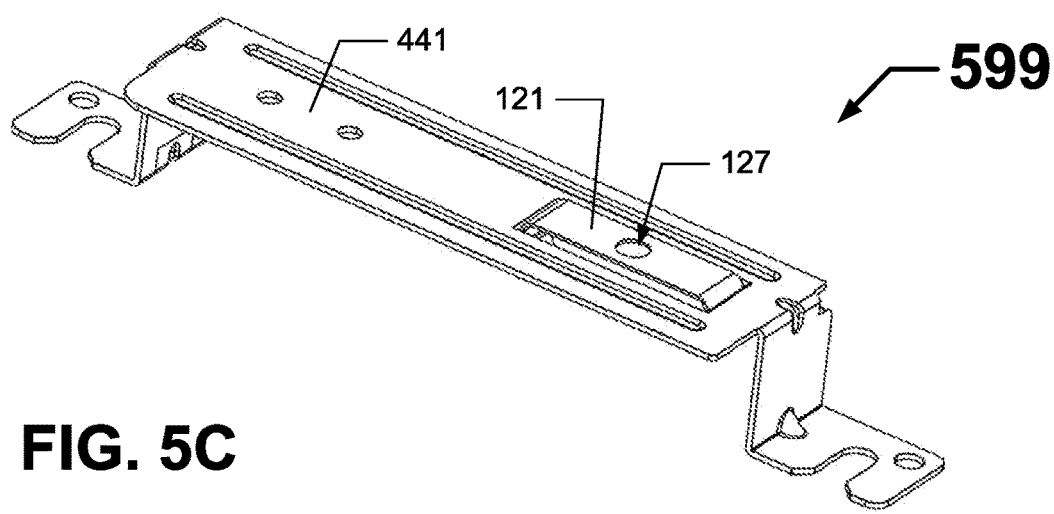

FIGS. 5A through 5C show an engagement system 599 that includes the engagement component 120 of FIGS. 1A through 1C and the bracket 440 of FIGS. 4A through 4D according to certain example embodiments. Specifically, FIG. 5A shows a side view of the engagement system 599. FIG. 5B shows a bottom perspective view of the engagement system 599. FIG. 5C shows a top perspective view of the engagement system 599. The engagement system 599 of FIGS. 5A through 5C can be substantially the same as the engagement system 399 discussed above, except as described below.

Referring to FIGS. 1A through 5C, the engagement system 599 shown in FIGS. 5A through 5C has the engagement component 120 coupled to the bracket 440. Specifically, when the engagement component 120 is coupled to the bracket 440, the proximal portion 123-1 of the bracket engagement extension 122-1 abuts against the front surface of the stop 451-1 of the engagement component receiving feature 452, the top part of the protruding portion 124-1 of the bracket engagement extension 122-1 abuts against the distal surface of the stop 451-1 of the engagement component receiving feature 452, and the distal portion 125-1 of the bracket engagement extension 122-1 is accessible within the space formed underneath the bracket body 441 of the bracket 441 because the height 446 of the bracket 440 is significantly larger than the height 126 of the engagement component 120.

Similarly, when the engagement component 120 coupled to the bracket 440, the proximal portion 123-2 of the bracket engagement extension 122-2 abuts against the front surface of the stop 451-2 of the engagement component receiving feature 452, the top part of the protruding portion 124-2 of the bracket engagement extension 122-2 abuts against the distal surface of the stop 451-2 of the engagement component receiving feature 452, and the distal portion 125-2 of the bracket engagement extension 122-2 is accessible within the space formed underneath the bracket body 441 of the bracket 441 because the height 446 of the bracket 440 is significantly larger than the height 126 of the engagement component 120.

When the engagement component 120 is coupled to the bracket 440, the coupling feature 127 that traverses the thickness of the engagement component body 121 is accessible because the engagement component receiving feature 452 is open between the stop 451-1 and the stop 451-2. This allows a user to access an independent coupling feature that is coupled to the coupling feature 127 of the engagement component 120 and/or to allow the top portion of the independent coupling feature to extend downward from the engagement component body 121 without contacting the bracket body 441.

The engagement component 120 as shown in FIGS. 5A through 5C can either be in a default position or under slight tension (where the default position is slightly expanded so that there is a larger separation between the distal portion 125-1 of the bracket engagement extension 122-1 and the distal portion 125-2 of the bracket engagement extension 122-2). To decouple the engagement component 120 from the bracket 440, a sufficiently large inward force must be applied simultaneously to the distal portion 125-1 of the bracket engagement extension 122-1 and to the distal portion 125-2 of the bracket engagement extension 122-2.

When this occurs, the protruding portion 124-1 of the bracket engagement extension 122-1 and the protruding portion 124-2 of the bracket engagement extension 122-2 are also moved inward, causing the proximal portion 123-1 and the protruding portion 124-1 of the bracket engagement extension 122-1 to stop abutting against the front surface and the distal surface, respectively, of the stop 451-1 of the engagement component receiving feature 452, and also simultaneously causing the proximal portion 123-2 and the protruding portion 124-2 of the bracket engagement extension 122-2 to stop abutting against the front surface and the distal surface, respectively, of the stop 451-2 of the engagement component receiving feature 452.

At that point, with the inward forces continuing to be applied to the distal portions 125 of the bracket engagement extensions 122, the engagement component 120 can be moved upward until the protruding portion 124-1 of the bracket engagement extension 122-1 and the protruding portion 124-2 of the bracket engagement extension 122-2 clear (are raised above) the engagement component receiving feature 452. From there, regardless of whether the inward forces continue to be applied to the distal portions 125 of the bracket engagement extensions 122, the engagement component 120 can continue to be moved upward until the distal portion 125-1 of the bracket engagement extension 122-1 and the distal portion 125-2 of the bracket engagement extension 122-2 clear the engagement component receiving feature 452.

In order to couple the engagement component 120 and the bracket 440 to each other, the reverse process can generally take place. In other words, regardless of whether the inward forces continue to be applied to the distal portions 125 of the bracket engagement extensions 122, the engagement component 120 can be positioned above the bracket 440 and moved downward until the distal portion 125-1 of the bracket engagement extension 122-1 and the distal portion 125-2 of the bracket engagement extension 122-2 enters the engagement component receiving feature 452.

From there, with sufficiently strong inward forces applied to the distal portions 125 of the bracket engagement extensions 122, the engagement component 120 can continue to be moved downward until the protruding portion 124-1 of the bracket engagement extension 122-1 is positioned below the stop 451-1 of the engagement component receiving feature 452 and the protruding portion 124-2 of the bracket engagement extension 122-2 is positioned below the stop 451-2 of the engagement component receiving feature 452.

In some cases, as when the bottom parts of the protruding portions 124 of the bracket engagement extensions 122 are sloped, there is no need to apply inward forces to the distal portions 125 of the bracket engagement extensions 122 as the engagement component 120 is moved downward because the sloped protruding portions 124 can cause the bracket engagement extensions 122 to move inward as the sloped protruding portions 124 slide downward against the inside surface of the stops 451 until the outermost part of the protruding portions 124 abut against the inside surface of the stops 451. Once the outermost part of the protruding portions 124 pass below the stops 451, the bracket engagement extensions 122 can expand to their default positions, which forces the outermost part of the protruding portions 124 to extend beyond the distal end of the stops 451. In any case, the coupling and decoupling between the bracket 240 and the engagement component 120 can be performed without the use of tools.

Figure 6A:
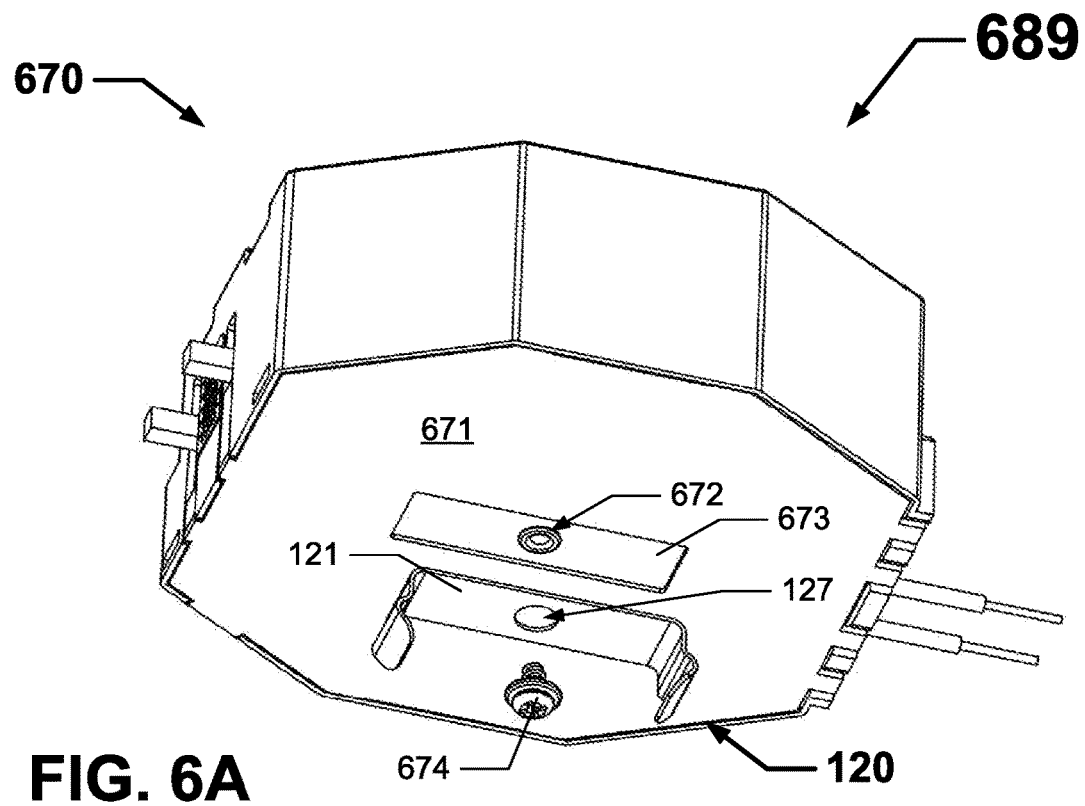
FIGS. 6A and 6B show a subassembly that includes the engagement component of FIGS. 1A through 1C and a driver compartment according to certain example embodiments.
Figure 6B:
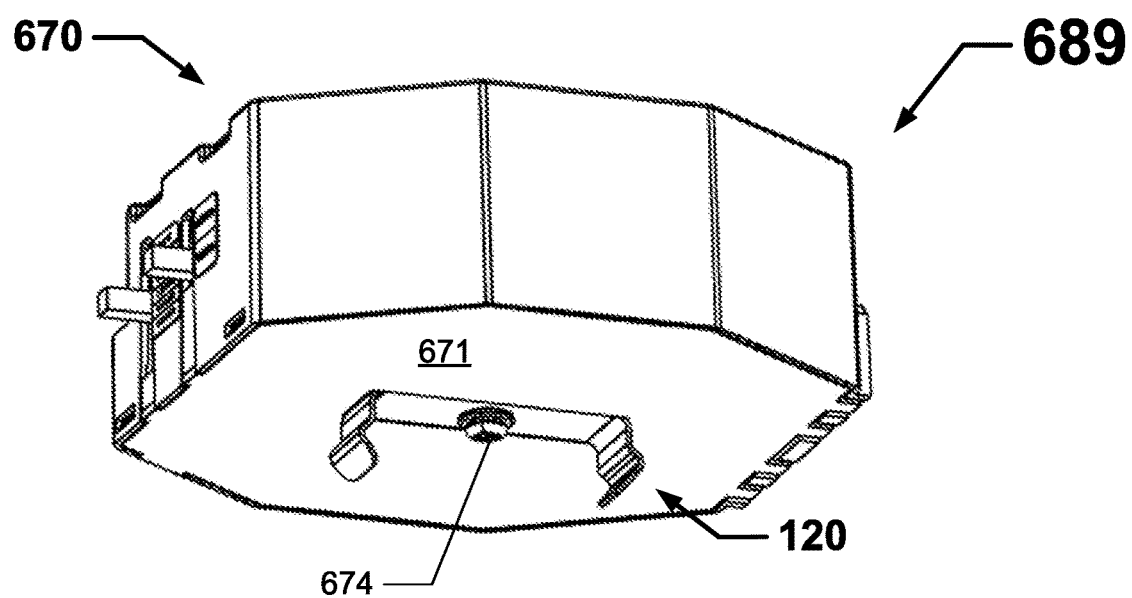

FIGS. 6A and 6B show a subassembly 689 that includes the engagement component 120 of FIGS. 1A through 1C and a driver compartment 670 according to certain example embodiments. Specifically, FIG. 6A shows an exploded bottom perspective view of the subassembly 689, and FIG. 6B shows a bottom perspective view of the subassembly 689. Referring to FIGS. 1A through 6B, the driver compartment 670 of the subassembly 689 of FIGS. 6A and 6B is configured to house a driver and/or other form of power source for the recessed luminaire. The driver compartment 670 in this example has a bottom surface 671 in which a coupling feature 672 in the form of a circular aperture is disposed. In certain optional embodiments, such as in this case, there is a recessed area 673 that surrounds the coupling feature 672. In such cases, the recessed area 673 can have substantially the same characteristics (e.g., length, width, depth, shape) as the corresponding characteristics of the body 121 of the engagement component 120.

An independent coupling feature 674 (in this case, in the form of a screw) is used to engage the coupling feature 127 of the engagement component 120 and the coupling feature 672 in the bottom surface 671 of the driver compartment 670, thereby coupling the engagement component 120 and the driver compartment 670 to each other. When the bottom surface 671 of the driver compartment 670 includes the recessed area 673, the top surface of the body 121 of the engagement component 120 can be seated within the recessed area 673 with the coupling feature 127 of the engagement component 120 and the coupling feature 672 of the driver compartment 670 aligned with each other.

Figure 7A:
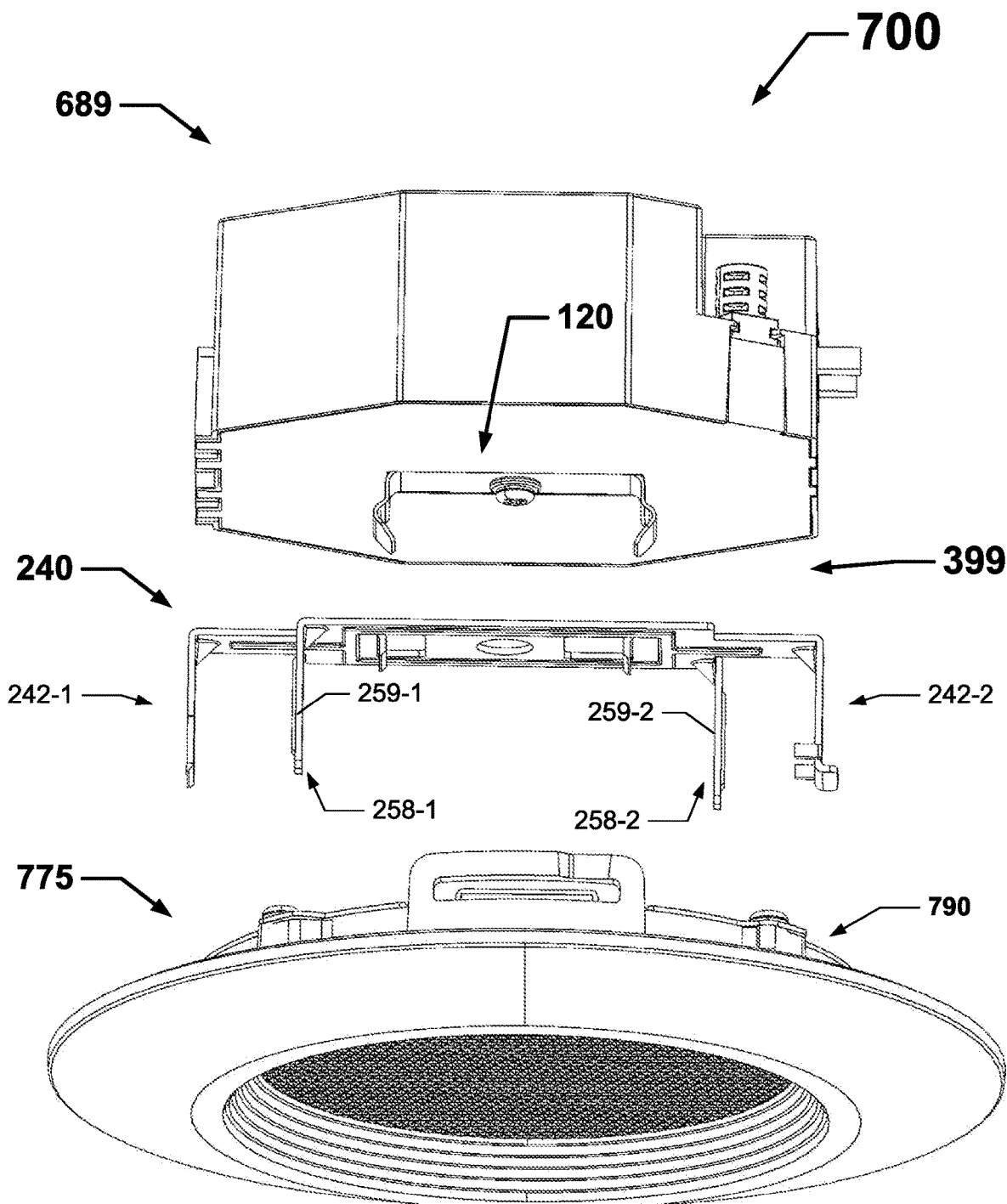
FIGS. 7A through 7E show a retrofit recessed luminaire that includes the engagement system of FIGS. 3A through 3D according to certain example embodiments.
Figure 7B:
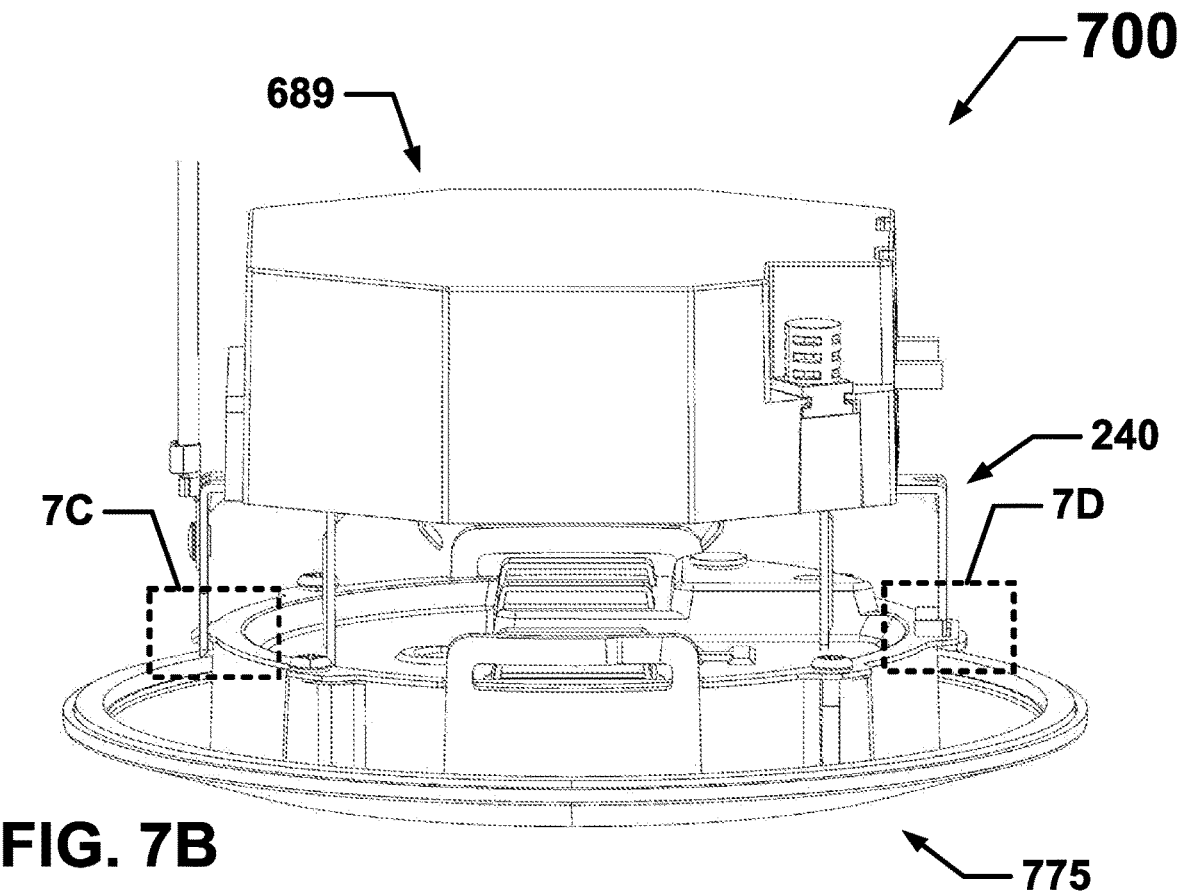
Figure 7C:
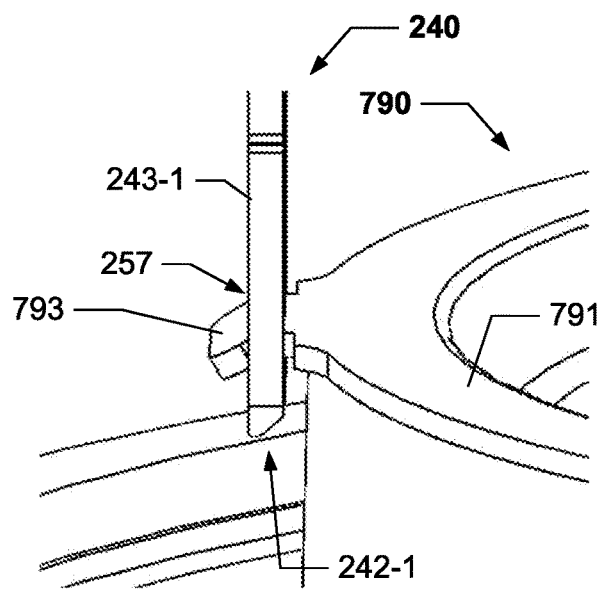
Figure 7D:
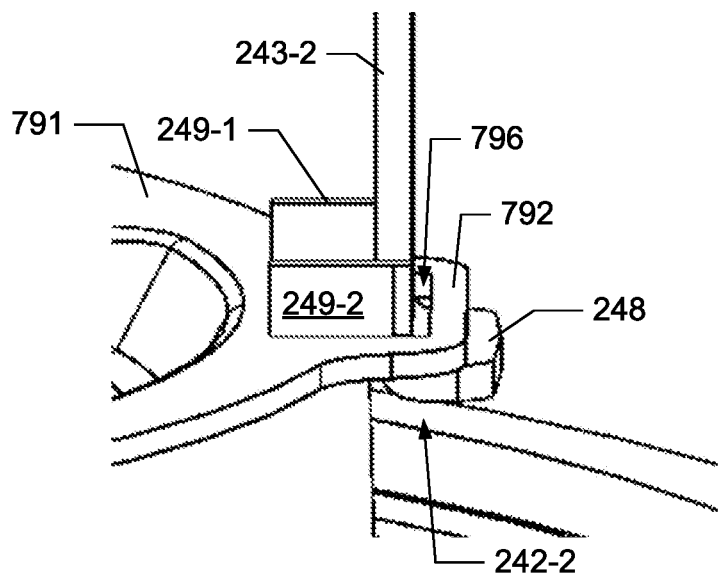
Figure 7E:
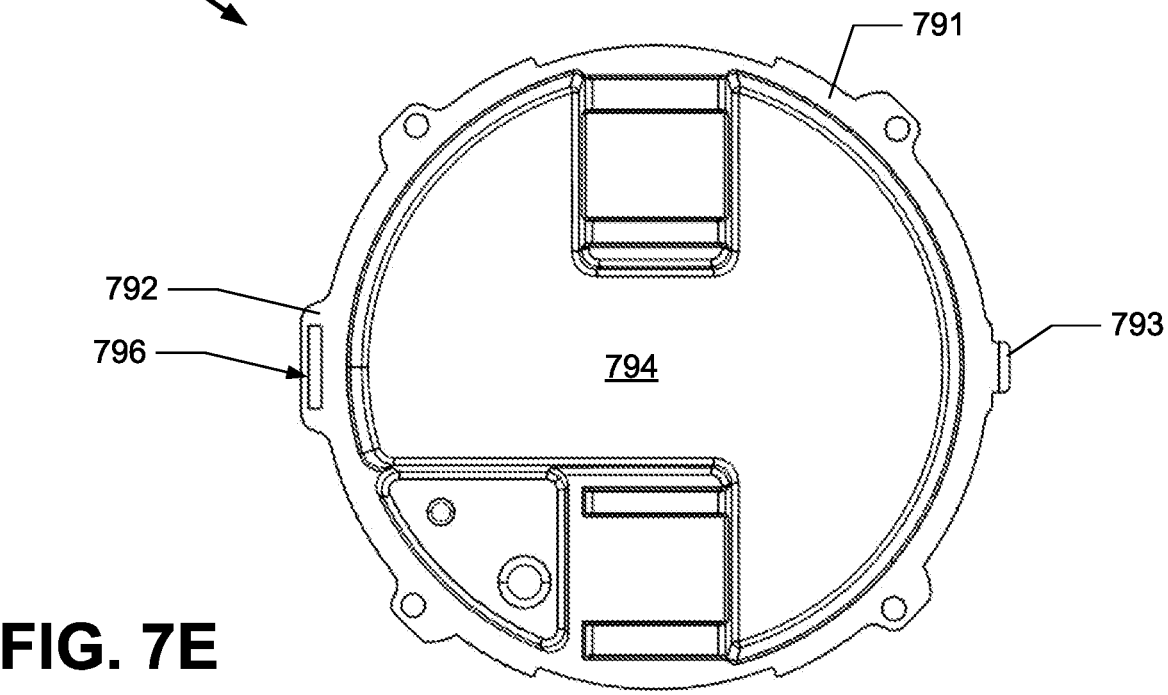

FIGS. 7A through 7E show a retrofit recessed luminaire 700 that includes the engagement system 399 of FIGS. 3A through 3D according to certain example embodiments. Specifically, FIG. 7A shows a partially exploded view of the retrofit recessed luminaire 700. FIG. 7B shows a front perspective view of the retrofit recessed luminaire 700. FIGS. 7C and 7D show detailed views of the retrofit recessed luminaire 700. FIG. 7E shows a top view of the top plate 790 of the retrofit recessed luminaire 700.

Referring to FIGS. 1A through 7E, the retrofit recessed luminaire 700 of FIGS. 7A through 7E includes the subassembly 689 of FIGS. 6A and 6B, the bracket 240 of FIGS. 2A through 2D, and a lighting assembly 775. The lighting assembly 775 can include one or more of a number of components, including but not limited to the top plate 790, a trim, light sources, a reflector, electrical wires, a heat sink, and a lens. The top plate 790 can be a cover located at the top end of the lighting assembly 775.

The top plate 790 of the lighting assembly 775 can include one or more of a number of coupling features that are designed to complement the various coupling features of the additional component coupling features 242 of the bracket 240. For example, the top plate 790 can include a flange 791 that is disposed around at least some of the outer perimeter to serve as the top surface of the top plate 790. At one location where the flange 791 is positioned can be a coupling feature 793 (also called a bracket coupling feature herein) in the form of a protrusion that extends away (e.g., at a slight downward angle (as in this case), directly laterally away) from the flange 791. In such a case, the coupling feature 793 of the top plate 790 can be configured to be positioned within the slot 257 that traverses the extension 243-1 of the additional component coupling feature 242-1 of the bracket 240, as shown in FIG. 7C.

As another example, as shown in FIG. 7D, the top plate 790 can include a coupling feature 796 (also called a bracket coupling feature herein) in the form of a slotted aperture that traverses an extension 792 that extends away (e.g., at a slight downward angle, directly laterally away (as in this case)) from the flange 791. In such a case, the coupling feature 796 of the top plate 790 can be configured to receive the curved distal end 248 of the additional component coupling feature 242-2 of the bracket 240. Further, the flange 791 of the top plate 790 on either side of the coupling feature 796 can be configured to receive (e.g., allow to have abutted/against) the protrusion 249-1 and the protrusion 249-2 of the additional component coupling feature 242-2 of the bracket 240. In such a case, the protrusions 249 limit the downward travel of the additional component coupling feature 242-2 (and so the bracket 240) relative to the coupling feature 796 (and so the rest of the top plate 790).

To couple the bracket 240 to the top plate 790, the bracket 240 is tilted in such a way that the curved distal end 248 of the additional component coupling feature 242-2 is substantially perpendicular to and positioned above the coupling feature 796 of the top plate 790. The bracket 240 can then be lowered relative to the top plate 790 so that the additional component coupling feature 242-2 slides within the coupling feature 796 in the top plate 790. When the protrusions 249 of the additional component coupling feature 242-2 of the bracket 240 contact the top surface of the flange 791 of the top plate 790, preventing the bracket 240 from being lowered any further relative to the top plate 790, the bracket 240 can be rotated relative to the top plate 790, using the coupling feature 796 and the curved distal end 248 as a hinge, in such a way that the additional component coupling feature 242-1 of the bracket 240 is lowered toward the coupling feature 796 of the top plate 790.

As the slot 257 that traverses the extension 243-1 of the additional component coupling feature 242-1 of the bracket 240 is positioned adjacent to the coupling feature 793 of the top plate 790, the additional component coupling feature 242-1 can be pulled outward and then moved downward slightly until the coupling feature 793 of the top plate 790 is aligned with the slot 257 in the additional component coupling feature 242-1. When the coupling feature 793 of the top plate 790 is aligned with the slot 257 in the additional component coupling feature 242-1, the outward force applied to the additional component coupling feature 242-1 can be removed, allowing the coupling feature 793 of the top plate 790 to be inserted into the slot 257.

In some cases, as when the bracket 240 includes one or more support extensions 258, the distal end of the body 259 of each support extension 258 can be configured to engage (e.g., abut against) the top surface of the body 794 of the top plate 790. In this example, the distal end of the body 259-1 of support extension 258-1 and the ]distal end of the body 259-2 of support extension 258-2 can abut against the top surface of the body 794 of the top plate 790 when the coupling feature 793 becomes inserted into the slot 257. In some cases, the body 794 of the top plate 790 can be recessed relative to the flange 791 of the top plate 790. The process of decoupling the bracket 240 from the top plate 790 can be executed by performing the above steps in reverse order.

Figure 8A:
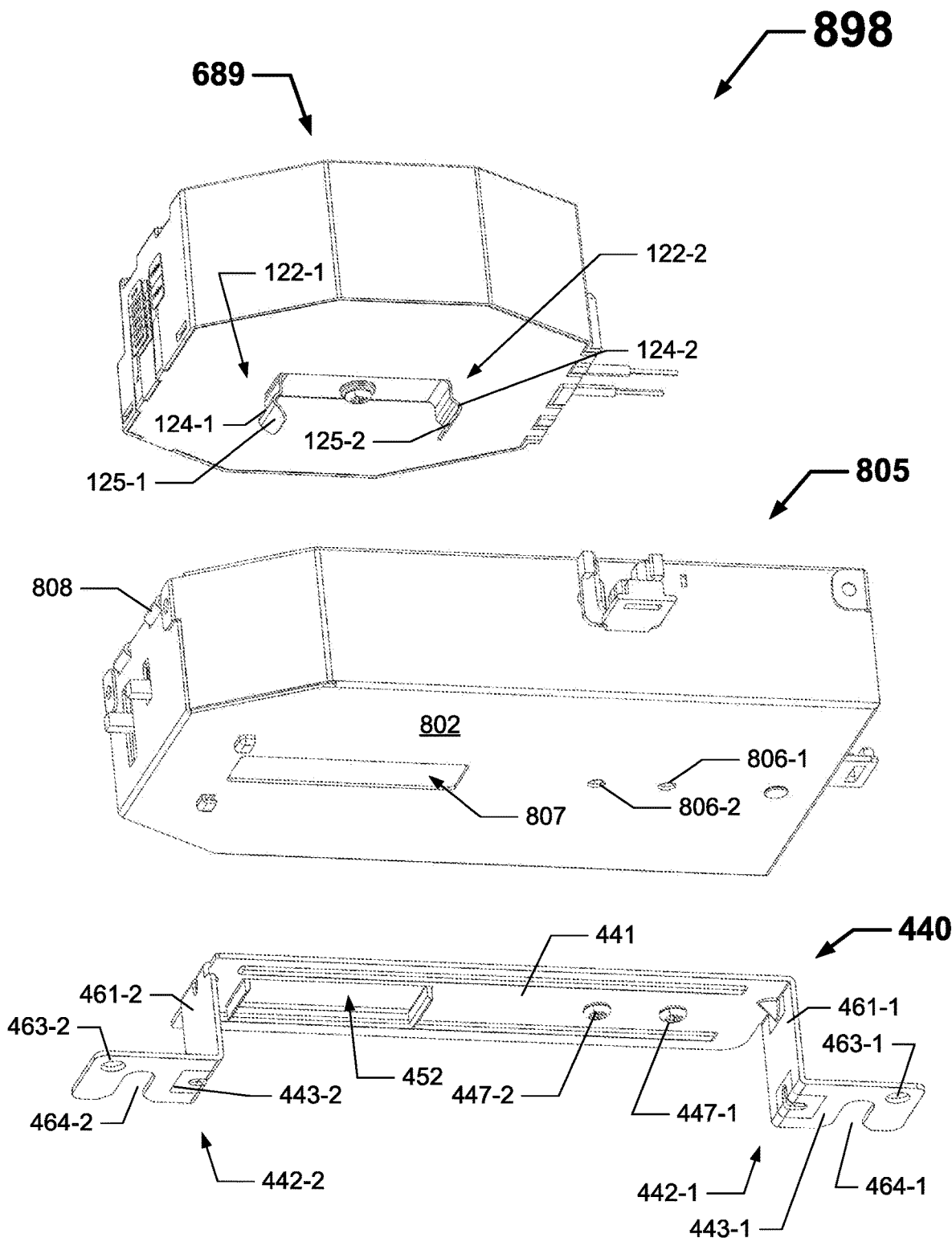
FIGS. 8A through 8C show an assembly of a direct mount recessed luminaire that includes the engagement system of FIGS. 5A through 5C according to certain example embodiments.
Figure 8B:
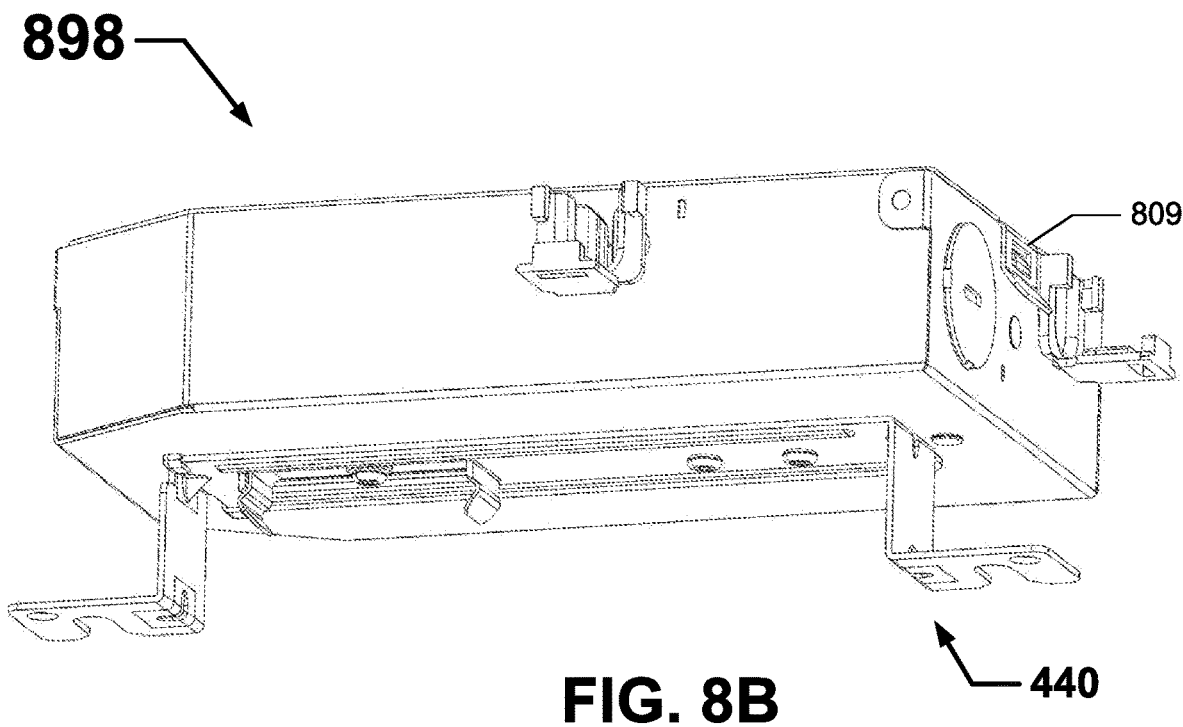
Figure 8C:
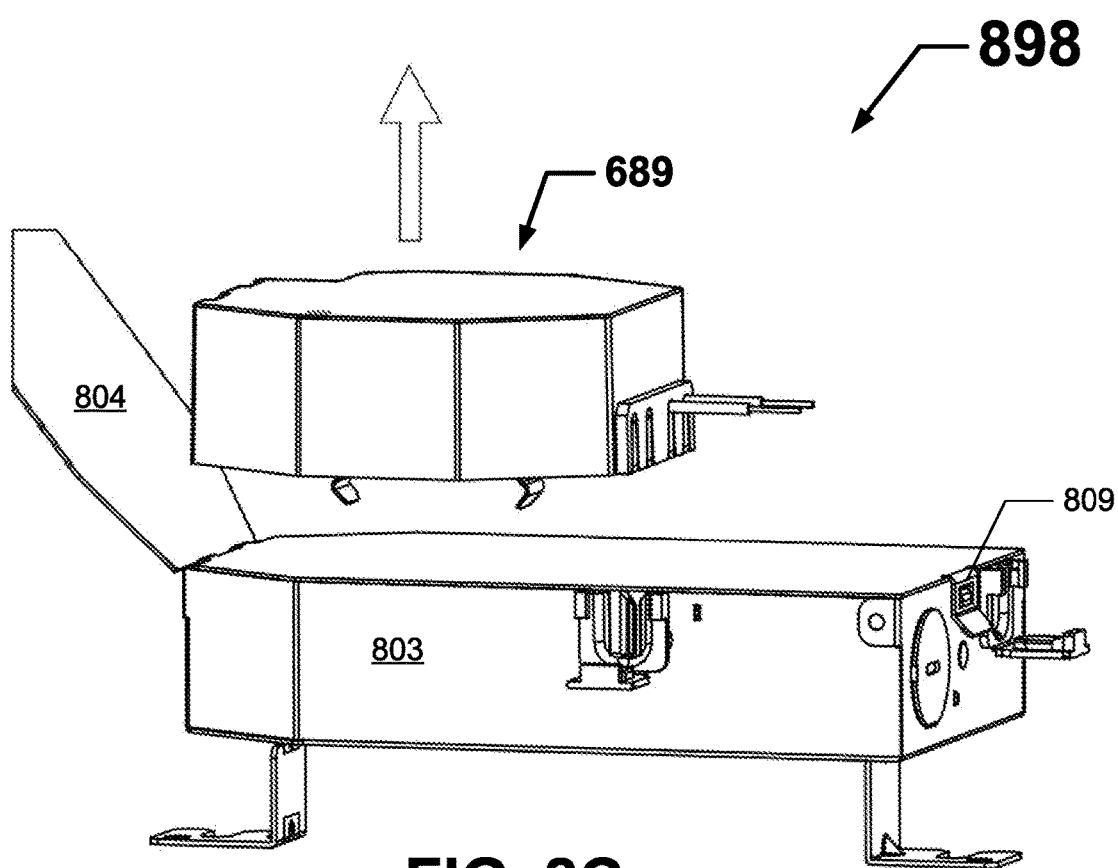

FIGS. 8A through 8C show an assembly 898 of a direct mount recessed luminaire that includes the engagement system 599 of FIGS. 5A through 5C according to certain example embodiments. Specifically, FIG. 8A shows a partially exploded view of the assembly 898. FIG. 8B shows a bottom perspective view of the assembly 898. FIG. 8C shows a partially exploded view of the assembly 898. Referring to FIGS. 1A through 8C, the assembly 898 of FIGS. 8A through 8C includes the subassembly 689 of FIGS. 6A and 6B, a junction box 805, and the bracket 440 of FIGS. 4A through 4D.

The junction box 805 of the assembly 898 can enclose one or more components of the direct mount recessed luminaire. Such components can include, but are not limited to, the subassembly 689, electrical wires, a controller, and one or more sensor devices. The junction box 805 can include a bottom wall 802, one or more side walls 803, and a top wall 804 that is movable (e.g., hinged, detachable) relative to the bottom wall 802 and side walls 803. In this case, the top wall 804 has one or more hinges 808 in one of the side walls 803. Also, one or more of the side walls 803 has a securing mechanism 809 (e.g., located opposite the hinges 808) that can be used to enclose the components within the junction box 805 by securing the top wall 804 to the side walls 803.

The bottom wall 802 of the junction box 805 can include one or more of a number of features. For example, the bottom wall 802 of the junction box 805 can include one or more coupling features 806 (e.g., coupling feature 806-1, coupling feature 806-2), in this case in the form of circular apertures, to allow the bracket 440 to be coupled directly or indirectly to the junction box 805. In this case, coupling feature 806-1 and coupling feature 806-2 have substantially similar characteristics (e.g., size, relative positioning, thread size) to the coupling feature 447-1 and coupling feature 447-2 in the body 441 of the bracket 440. In this way, in this example, in order to couple the bracket 440 to the junction box 805, one independent coupling feature (e.g., a screw, a bolt, a rivet) can be disposed in the coupling feature 447-1 of the bracket 440 and the coupling feature 806-1 of the junction box 805, while another independent coupling feature be disposed in the coupling feature 447-2 of the bracket 440 and the coupling feature 806-2 of the junction box 805.

As another example, the bottom wall 802 of the junction box 805 can include an aperture 807, in this example rectangular in shape that traverses the thickness of the bottom wall 802. The aperture 807 can have a size that is at least as large as the engagement component receiving feature 452 of the bracket 440. Also, the location of the aperture 807 on the bottom wall 802 of the junction box 805 can be configured to align with the engagement component receiving feature 452 of the bracket 440 when the bracket 440 is coupled to the junction box 805 using the coupling features 447 of the bracket 440 and the coupling features 806 of the junction box 805. The engagement component 120, part of the subassembly 689, can pass through the aperture 807 and become coupled to the engagement component receiving feature 452 of the bracket 440 (as discussed above with respect to FIGS. 5A through 5C) when the subassembly 689 is lowered into the junction box 805 (with the top wall 804 in an open position). Similarly, when the engagement component 120 of the subassembly 689 decouples from the bracket 440, the engagement component 120 can pass through the aperture 807 as the subassembly 689 is removed from the junction box 805.

The bracket 440 includes two additional component coupling features 442 that are configured substantially identically to each other. Additional component coupling feature 442-1 includes a body 461-1 that extends downward from one end of the bracket body 441, an extension 443-1 that extends outward perpendicularly from the distal end of the body 461-1, a coupling feature 463-1 in the form of a slot that traverses the thickness of the extension 443-1 and originates at a side of the extension 443-1, and a coupling feature 464-1 in the form of a circular aperture that traverses the thickness of the extension 443-1. Additional component coupling feature 442-2 includes a body 461-2 that extends downward from the opposite end of the bracket body 441, an extension 443-2 that extends outward perpendicularly from the distal end of the body 461-2, a coupling feature 463-2 in the form of a slot that traverses the thickness of the extension 443-2 and originates at a side of the extension 443-2, and a coupling feature 464-2 in the form of a circular aperture that traverses the thickness of the extension 443-2.

Figure 9:
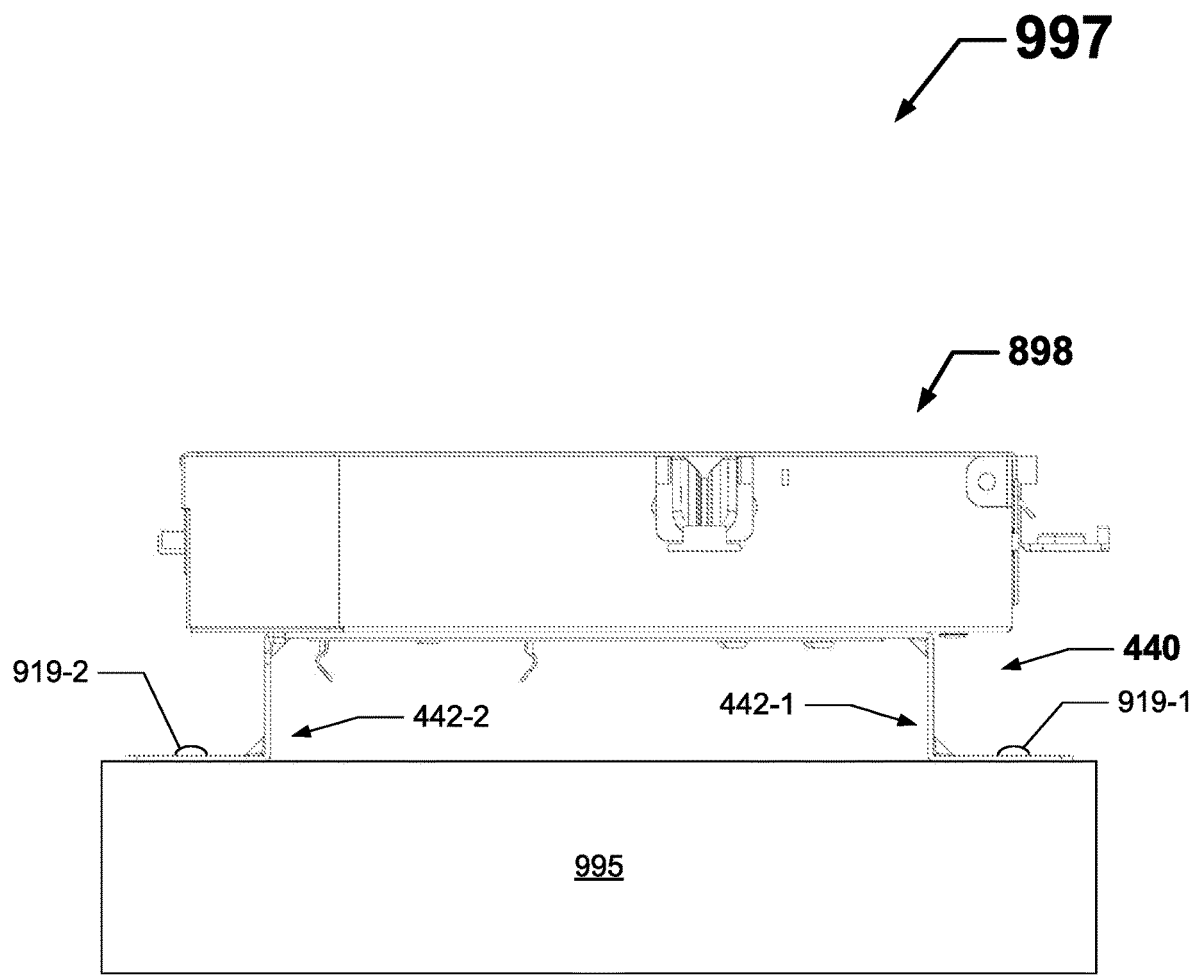
FIG. 9 shows a system that includes the assembly of FIGS. 8A through 8C mounted to a structure according to certain example embodiments.

FIG. 9 shows a system 997 that includes the assembly 898 of FIGS. 8A through 8C mounted to a structure 995 according to certain example embodiments. Referring to FIGS. 1A through 9, the additional component coupling feature 442-1 and the additional component coupling feature 442-2 of the bracket 440 of the assembly 898 are coupled to the structure 995 to which the recessed luminaire is mounted using independent coupling features 919 (e.g., screws, bolts, rivets). Specifically, coupling feature 919-1 is coupled to one of the coupling features (e.g., coupling feature 463-1, coupling feature 464-1) of the additional component coupling feature 442-1, as shown and described above, and to a complementary coupling feature (e.g., an aperture aligned with the coupling feature of the additional component coupling feature 442-1) in the structure 995. Similarly, coupling feature 919-2 is coupled to one of the coupling features (e.g., coupling feature 463-2, coupling feature 464-2) of the additional component coupling feature 442-2, as shown and described above, and to a complementary coupling feature (e.g., an aperture aligned with the coupling feature of the additional component coupling feature 442-2) in the structure 995.

The structure 995 is a physical composition to which one or more of the additional component coupling features 442 of the bracket 440 can mount. This allows an associated recessed luminaire (or portion thereof) to be mounted at a certain location and/or in a certain position for use (e.g., to provide general illumination to a volume of space, to provide accent lighting in a volume of space). Examples of a structure 995 can include, but are not limited to, a frame of a recessed luminaire, drywall, a stud, a ceiling joist, an I-beam, and a concrete wall. In this case, the structure 995 is configured (e.g., oriented) in such a way that the assembly 898 is horizontally mounted to the structure 995.

Figure 10:
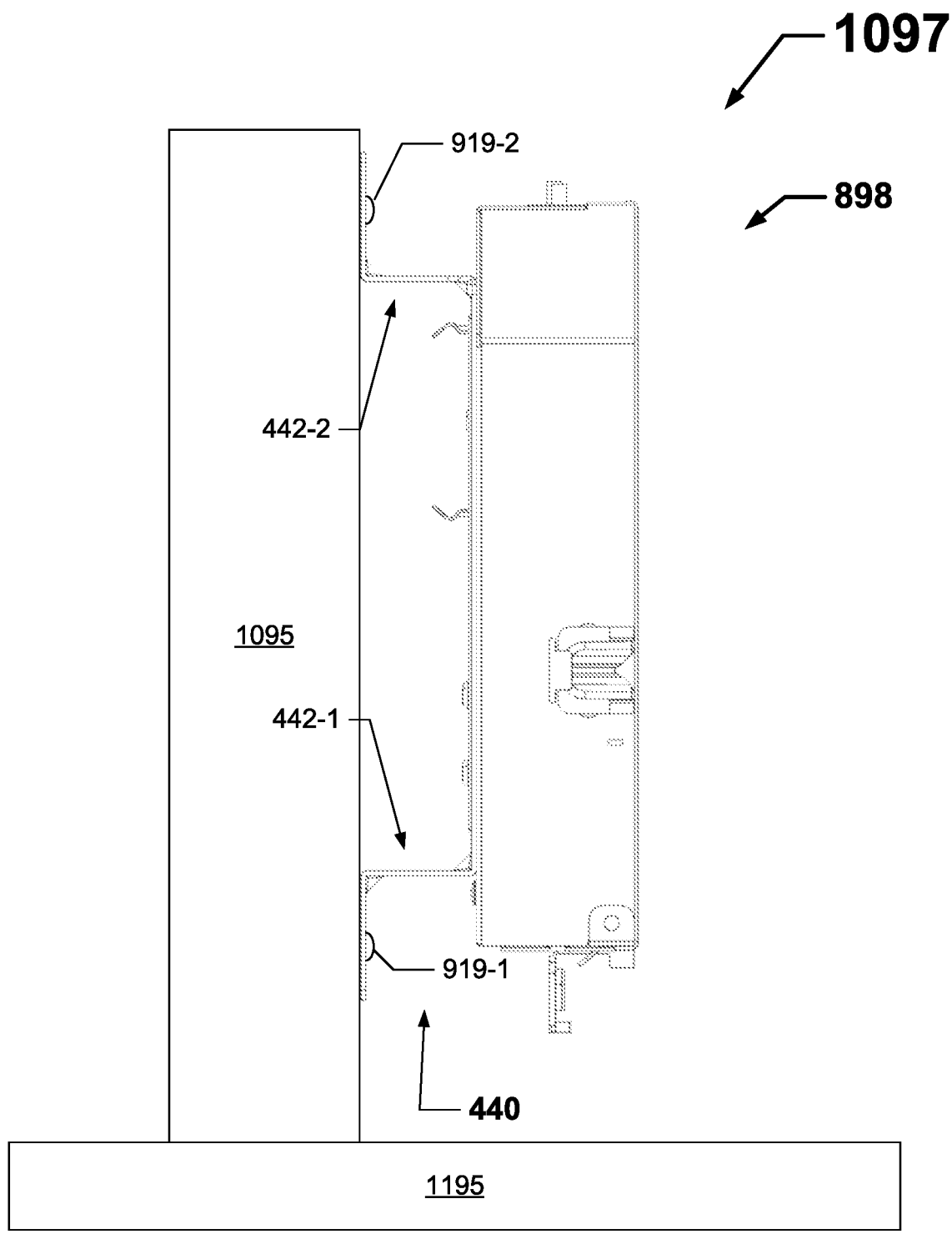
FIG. 10 shows another system that includes the assembly of FIGS. 8A through 8C mounted to a structure according to certain example embodiments.

FIG. 10 shows another system 1097 that includes the assembly 898 of FIGS. 8A through 8C mounted to a structure 1095 according to certain example embodiments. Referring to FIGS. 1A through 10, the additional component coupling feature 442-1 and the additional component coupling feature 442-2 of the bracket 440 of the assembly 898 are coupled to the structure 1095 to which the recessed luminaire is mounted using independent coupling features 1019 (e.g., screws, bolts, rivets).

Specifically, coupling feature 1019-1 is coupled to one of the coupling features (e.g., coupling feature 463-1, coupling feature 464-1) of the additional component coupling feature 442-1, as shown and described above, and to a complementary coupling feature (e.g., an aperture aligned with the coupling feature of the additional component coupling feature 442-1) in the structure 1095. Similarly, coupling feature 1019-2 is coupled to one of the coupling features (e.g., coupling feature 463-2, coupling feature 464-2) of the additional component coupling feature 442-2, as shown and described above, and to a complementary coupling feature (e.g., an aperture aligned with the coupling feature of the additional component coupling feature 442-2) in the structure 1095.

The structure 1095 (e.g., a ceiling joist) is substantially similar to the structure 995 of FIG. 9, except that in this case the structure 1095 of FIG. 10 is configured (e.g., oriented) in such a way that the assembly 898 is vertically mounted to the structure 1095. The system 1097 of FIG. 10 also includes another structure 1195 (e.g., drywall, a ceiling tile) that is not used directly to mount the assembly 898. In such a case, the structure 1095 and the assembly 898 can be positioned in a plenum space, which is defined by the structure 1195.

Example embodiments can be used to allow a user to quickly and efficiently transfer a driver compartment of a recessed luminaire from direct mount to a retrofit application or from a retrofit application to direct mount without the use of a tool. Example embodiments can be used with recessed luminaires having any of a number of sizes and/or features. Example embodiments can be used in new installations of recessed luminaires as well as retrofitting existing luminaires. Example embodiments also provide a number of other benefits. Such other benefits can include, but are not limited to, increased ease of maintenance, greater ease of use, catering to user preferences, and compliance with industry standards that apply to luminaires.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

The invention claimed is:

1. An engagement system for a recessed luminaire, the engagement system comprising:
an engagement component comprising an engagement component body, a first bracket engagement extension that extends from a first portion of the engagement component body, and a second bracket engagement extension that extends from a second portion of the engagement component body, wherein the first bracket engagement extension and the second bracket engagement extension are movable with respect to the engagement component body;
a bracket configured to be detachably coupled to the engagement component, wherein the bracket comprises a bracket body, a first additional component coupling feature that extends from a first portion of the bracket body, and a second additional component coupling feature that extends from a second portion of the bracket body, wherein the bracket body comprises an engagement component receiving feature that is configured to engage the first bracket engagement extension and the second bracket engagement extension, and wherein the engagement component is configured to couple to and decouple from the bracket when the first bracket engagement extension and the second bracket engagement extension are moved with respect to the engagement component body; and
wherein the bracket further comprises a support extension that extends from the bracket body substantially parallel to the first additional component coupling feature and the second additional component coupling feature, and wherein the support extension is configured to abut against a top plate of a housing of the recessed luminaire.

2. The engagement system of claim 1, wherein the engagement component comprises a U-shaped flat spring.

3. The engagement system of claim 1, wherein the bracket is U-shaped, and wherein the bracket is substantially rigid.

4. The engagement system of claim 1, wherein the first engagement component receiving feature and a second engagement component receiving feature of the bracket body comprises apertures that traverse a thickness of the bracket body.

5. The engagement system of claim 1, wherein the engagement component body of the engagement component comprises a coupling feature that is configured to couple to a driver compartment of the recessed luminaire.

6. The engagement system of claim 5, wherein the bracket body of the bracket has an aperture that traverses therethrough, wherein the aperture aligns with the coupling feature of the engagement component body when the engagement component is coupled to the bracket.

7. An engagement system for a recessed luminaire, the engagement system comprising:
an engagement component comprising an engagement component body, a first bracket engagement extension that extends from a first portion of the engagement component body, and a second bracket engagement extension that extends from a second portion of the engagement component body, wherein the first bracket engagement extension and the second bracket engagement extension are movable with respect to the engagement component body; and
a bracket configured to be detachably coupled to the engagement component, wherein the bracket comprises a bracket body, a first additional component coupling feature that extends from a first portion of the bracket body, and a second additional component coupling feature that extends from a second portion of the bracket body, wherein the bracket body comprises an engagement component receiving feature that is configured to engage the first bracket engagement extension and the second bracket engagement extension, and wherein the engagement component is configured to couple to and decouple from the bracket when the first bracket engagement extension and the second bracket engagement extension are moved with respect to the engagement component body, wherein the first engagement component receiving feature is formed by peeling back a part of the bracket body in a downward direction.

8. A recessed luminaire comprising:
a driver compartment that houses a driver, wherein the driver compartment comprises a first coupling feature along a bottom surface; and
an engagement system comprising:
an engagement component comprising an engagement component body, a first bracket engagement extension that extends from a first portion of the engagement component body, and a second bracket engagement extension that extends from a second portion of the engagement component body, wherein the first bracket engagement extension and the second bracket engagement extension are movable with respect to the engagement component body, and wherein the engagement component body comprises a second coupling feature that complements the first coupling feature of the driver compartment; and
a bracket configured to be detachably coupled to the engagement component, wherein the bracket comprises a bracket body, a first additional component coupling feature that extends from a first portion of the bracket body, and a second additional component coupling feature that extends from a second portion of the bracket body, wherein the bracket body comprises an engagement component receiving feature that is configured to engage the first bracket engagement extension and the second bracket engagement extension, wherein the engagement component is able to couple to and decouple from the bracket when the first bracket engagement extension and the second bracket engagement extension are moved with respect to the engagement component body; and
wherein the bracket further comprises a support extension that extends from the bracket body substantially parallel to the first additional component coupling feature and the second additional component coupling feature, and wherein the support extension is configured to abut against a top plate of a housing of the recessed luminaire.

9. The recessed luminaire of claim 8, further comprising:
a top plate of a lighting assembly, wherein the top plate comprises a first bracket coupling feature and a second bracket coupling feature, wherein the first bracket coupling feature is configured to couple to the first additional component coupling feature, and wherein the second bracket coupling feature is configured to couple to the second additional component coupling feature.

10. The recessed luminaire of claim 9, wherein the first additional component coupling feature comprises a slot that traverses a first extension of the bracket, and wherein the second additional component coupling feature comprises a curved distal end of a second extension of the bracket.

11. The recessed luminaire of claim 8, wherein the first bracket engagement extension and the second bracket engagement extension are accessible under the bracket when the engagement component is coupled to the bracket.

12. The recessed luminaire of claim 8, wherein the first additional component coupling feature and the second additional component coupling feature of the bracket are configured to couple to a structure to which the engagement system is mounted.

13. The recessed luminaire of claim 12, wherein the structure comprises a frame of the recessed luminaire.

14. The recessed luminaire of claim 8, further comprising:
a junction box that houses the driver compartment, wherein a bottom wall of the junction box has an aperture that traverses therethrough, wherein the engagement component passes through the aperture when the driver compartment is inserted into or removed from the junction box.

* * * * *